(12) United States Patent
Kim et al.

(10) Patent No.: US 10,884,619 B2
(45) Date of Patent: Jan. 5, 2021

(54) CHARACTER INPUT METHOD AND DISPLAY APPARATUS

(71) Applicant: SAMSUNG ELECTRONICS CO., LTD., Suwon-si (KR)

(72) Inventors: Byuk-sun Kim, Seoul (KR); Min-jin Kim, Pyeongtaek-si (KR); Sang-on Choi, Suwon-si (KR); Sung-gook Kim, Seoul (KR); Yong-deok Kim, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/497,951

(22) Filed: Apr. 26, 2017

(65) Prior Publication Data
US 2017/0228152 A1   Aug. 10, 2017

Related U.S. Application Data

(62) Division of application No. 14/334,892, filed on Jul. 18, 2014, now abandoned.

(30) Foreign Application Priority Data

Jul. 29, 2013 (KR) .................. 10-2013-0089757
Jan. 14, 2014 (KR) .................. 10-2014-0004673

(51) Int. Cl.
*G06F 3/0488* (2013.01)
*G06F 17/27* (2006.01)
(Continued)

(52) U.S. Cl.
CPC .......... *G06F 3/04886* (2013.01); *G06F 3/017* (2013.01); *G06F 3/0236* (2013.01);
(Continued)

(58) Field of Classification Search
CPC .. G06F 3/04886; G06F 17/276; G06F 3/0237; G06F 3/04842
See application file for complete search history.

(56) References Cited

U.S. PATENT DOCUMENTS 7,363,224 B2   4/2008   Huang et al.
8,253,709 B2   8/2012   Chang et al.
(Continued)

FOREIGN PATENT DOCUMENTS

CN   101369187 A   2/2009
CN   101876878 A   11/2010
(Continued)

OTHER PUBLICATIONS

Examination Report dated Aug. 30, 2017, by the European Patent Office in counterpart European Application No. 14833028.5.
(Continued)

*Primary Examiner* — Lixi C Simpson
(74) *Attorney, Agent, or Firm* — Sughrue Mion, PLLC

(57) ABSTRACT

A display apparatus is provided. The display apparatus includes: a display configured to display a virtual keyboard; an inputter configured to receive a stroke input on a key on the virtual keyboard; and a controller configured to display a character which corresponds to the key in an input window in response to the stroke input being received, and configured to perform a control operation to suggest at least one character that is likely to follow a character which corresponds to the key and display the at least one suggested character. The at least one suggested character is displayed so as not to overlap a character of a basic key on the virtual keyboard.

9 Claims, 16 Drawing Sheets

(51) Int. Cl.
  *G06F 3/0482* (2013.01)
  *G06F 3/01* (2006.01)
  *G06F 3/0346* (2013.01)
  *G06F 3/0489* (2013.01)
  *G06F 3/023* (2006.01)
  *G06F 40/274* (2020.01)

(52) U.S. Cl.
  CPC .......... *G06F 3/0237* (2013.01); *G06F 3/0346* (2013.01); *G06F 3/0482* (2013.01); *G06F 3/04892* (2013.01); *G06F 40/274* (2020.01); *G06F 2203/04804* (2013.01)

(56) References Cited

U.S. PATENT DOCUMENTS

| | | |
|---|---|---|
| 8,949,743 B2 | 2/2015 | Kida et al. |
| 9,285,953 B2 | 3/2016 | Kim et al. |
| 9,348,503 B2 | 5/2016 | Kajiyama |
| 9,354,802 B2 | 5/2016 | Kajiyama |
| 2005/0149328 A1 | 7/2005 | Huang et al. |
| 2007/0174788 A1 | 7/2007 | Ording |
| 2008/0180403 A1* | 7/2008 | Park ................. G06F 3/0237 345/173 |
| 2008/0284744 A1 | 11/2008 | Park et al. |
| 2008/0291171 A1 | 11/2008 | Shin |
| 2009/0051661 A1* | 2/2009 | Kraft ................. G06F 3/04886 345/173 |
| 2010/0066695 A1* | 3/2010 | Miyazaki ........... G06F 3/04886 345/173 |
| 2010/0277424 A1 | 11/2010 | Chang et al. |
| 2010/0289761 A1 | 11/2010 | Kajiyama |
| 2011/0078567 A1 | 3/2011 | Kim et al. |
| 2011/0099506 A1 | 4/2011 | Gargi |
| 2011/0148787 A1 | 6/2011 | Kim |
| 2011/0154246 A1* | 6/2011 | Oh .................... G06F 3/04886 715/773 |
| 2012/0047454 A1 | 2/2012 | Harte |
| 2012/0200508 A1* | 8/2012 | Merrett .............. G06F 3/0236 345/173 |
| 2012/0242582 A1 | 9/2012 | Choi et al. |
| 2013/0091455 A1 | 4/2013 | Park et al. |
| 2013/0157725 A1 | 6/2013 | Kajiyama |
| 2013/0205242 A1* | 8/2013 | Colby ................. G06F 3/0482 715/773 |
| 2014/0115538 A1 | 4/2014 | Kim et al. |
| 2015/0095828 A1* | 4/2015 | Iida .................... G06F 3/04883 715/771 |
| 2016/0246500 A1 | 8/2016 | Kajiyama |

FOREIGN PATENT DOCUMENTS

| | | |
|---|---|---|
| CN | 101910986 A | 12/2010 |
| DE | 20 2013 100 128 U1 | 5/2013 |
| JP | 2012-118582 A | 6/2012 |
| JP | 2012-234342 A | 11/2012 |
| KR | 10-2005-0048978 A | 5/2005 |
| KR | 10-2008-0042056 A | 5/2008 |
| KR | 10-2009-0025568 A | 3/2009 |
| KR | 10-2011-0035724 A | 4/2011 |
| KR | 10-2012-0100655 A | 9/2012 |
| RU | 2377664 C2 | 12/2009 |

OTHER PUBLICATIONS

Communication dated Dec. 19, 2016 issued by the European Patent Office in counterpart European Patent Application No. 14833028.5.
Communication, Issued by the International Searching Authority, dated Nov. 3, 2014, in counterpart International Application No. PCT/KR2014/006459.
European Search Report dated Mar. 22, 2017, by the European Patent Office in counterpart European Application No. 14833028.5.
Examination Report dated Apr. 3, 2017, by the European Patent Office in counterpart European Application No. 14833028.5.
Communication dated Apr. 18, 2018, from the European Patent Office in counterpart European Application No. 14833028.5.
Communication dated Jun. 28, 2018 issued by the Russian Patent Office in counterpart Russian Application No. 2016106682.
Communication dated Jul. 2, 2018, issued by the State Intellectual Property Office of P.R. China in counterpart Chinese Application No. 201480042697.7.
Communication dated Oct. 19, 2018, issued by the European Patent Office in counterpart European Application No. 14 833 028.5.
Office Action dated Jan. 31, 2019 by the State Intellectual Property Office of P.R. China in counterpart Chinese Patent Application No. 201480042697.7.
Communication dated Jul. 30, 2019, from the State Intellectual Property Office of People's Republic of China in counterpart Application No. 201480042697.7.
Communication dated Jun. 30, 2020, issued by the Korean Intellectual Property Office in Korean Application No. 10-2014-0004673.
Communication dated Jun. 30, 2020, from the Intellectual Property Office of India in Application No. 201627004908.

* cited by examiner

CHARACTER INPUT METHOD AND DISPLAY APPARATUS

CROSS-REFERENCE TO RELATED APPLICATION(S)

This application is a Divisional of U.S. application Ser. No. 14/334,892 filed Jul. 18, 2014, which claims priority from Korean patent applications filed on Jul. 29, 2013 and Jan. 14, 2014 in the Korean Intellectual Property Office and respectively assigned Serial Nos. 10-2013-0089757 and 10-2014-0004673, the entire disclosures of which are hereby incorporated herein by reference, in their entireties.

BACKGROUND

Technical Field

Apparatuses and methods consistent with exemplary embodiments relate to a character input method, and more particularly, to a character input method and a display apparatus for easily inputting a character on a virtual keyboard.

Description of the Related Art

As display apparatuses equipped with various functions, such as smart television (TVs) have been developed, technology for inputting characters into the display apparatus is developing. Virtual keyboard technology used to retrieve information, write emails, and create documents is one of the examples of character input technology.

This character input technology enables the display apparatus to display a virtual keyboard on a screen and permits users to input characters by touching a touch screen or stroking a key on the virtual keyboard by using an input apparatus, such as a pointing apparatus. The 'stroke' recited herein refers to an operation of pressing a key on the virtual keyboard to input a character corresponding to the key. The stroke input can apply when a motion (gesture) by a user object is input. For example, changing a hand motion, which is the user object, being set as the stroke input. Specifically, a motion of clenching user's first may be set as the stroke input.

In addition, the virtual keyboard can provide a suggestion character display function. The suggestion character display function refers to a function that, when the user inputs a character by stroking a certain corresponding key on the virtual keyboard, displays a character on the screen that may follow the input character in a specific term or in a language use situation.

Accordingly, there is a demand for a method for improving user convenience and input accuracy when a character is suggested on the virtual keyboard, as described above.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a character input method and a display apparatus, which can improve user convenience and input accuracy in response to a character being suggested on a virtual keyboard.

According to an aspect of an exemplary embodiment, there is provided a display apparatus including: a display configured to display a virtual keyboard; an inputter configured to receive a stroke input on a key on the virtual keyboard; and a controller configured to display a character corresponding to the key in an input window, in response to the stroke input being received, and configured to control to suggest at least one character that is likely to follow a character which corresponds to the key and display the at least one suggested character, and wherein the at least one suggested character is displayed so as not to overlap a character of a basic key on the virtual keyboard.

The controller may be configured to arrange the at least one suggested character on a diagonal direction at a corner of the stroke-input key.

The at least one suggested character may be displayed on a side of the stroke-input key with its shape being changed.

The controller may be configured to display the at least one suggested character on a side of the stroke-input key, and the controller may change a location of another key adjacent to the stroke-input key and display the another key.

The at least one suggested character may be transparently displayed on a side of the stroke-input key.

The controller may be configured to perform a control operation to display a key which corresponds to the at least one suggested character on the virtual keyboard, in order to be distinguished from other keys.

In response to a pointer being placed on a certain key of the virtual keyboard, the controller may be configured to perform a control operation to display the key, to be distinguished from the other keys, on the virtual keyboard where the pointer is placed.

In response to a stroke being input onto the at least one suggested character, the controller may be configured to display the at least one suggested character in the input window, and may control the at least one suggested character to disappear from the virtual keyboard.

In response to a pointer being placed away from the at least one suggested character on the virtual keyboard by more than a predetermined distance, the controller may be configured to control the at least one suggested character to disappear from the virtual keyboard.

In response to an input mode of the display apparatus being changed, the controller may perform a control operation in order to display information on a display location related to the at least one suggested character, on a certain area of the virtual keyboard.

In response to an acceleration higher than a predetermined value being sensed in a direction of the at least one suggested character through a remote control apparatus, the controller may be configured to control the at least one suggested character to disappear from the virtual keyboard.

According to an aspect of another exemplary embodiment, there is provided a character input method including: displaying a virtual keyboard; receiving a stroke input on a key on the virtual keyboard; and in response to the stroke input being received, displaying in an input window a character which corresponds to the key, and suggesting at least one character that is likely to follow the character which corresponds to the key and displaying the at least one suggested character, and wherein the at least one suggested character is displayed so as not to overlap a basic key on the virtual keyboard.

The at least one suggested character may be arranged on a diagonal direction at a corner of the stroke-input key.

The at least one suggested character may be displayed on a side of the stroke-input key with its shape being changed.

The suggesting the at least one character and the displaying may include displaying the at least one suggested character on a side of the stroke-input key, changing a location of another key adjacent to the stroke-input key and displaying the another key.

The at least one suggested character may be transparently displayed on a side of the stroke-input key.

The character input method may further include displaying a key, to be distinguished from other keys, which corresponds to the at least one suggested character on the virtual keyboard.

According to an aspect of still another exemplary embodiment, there is provided a character input method including: calling a character input screen; selecting an input apparatus for inputting a character; distinguishing a type of input apparatus based on information related to the selected input apparatus; in response to a stroke input on a key on a virtual keyboard displayed on the character input screen being received, displaying a different user interface to display a suggestion character according to the type of the input apparatus; and in response to a stroke input on the suggestion character being received, displaying the suggestion character in an input window.

The displaying the user interface may include, in response to the input apparatus being a four-direction input apparatus or being in a four-direction input mode, and the stroke input on the key on the virtual keyboard displayed on the character input screen being received, displaying the suggestion character on a side of the stroke-input key.

The displaying the user interface may include, in response to the input apparatus being a pointing input apparatus or being in a pointing input, and the stroke input on the key on the virtual keyboard displayed on the character input screen being received, displaying the suggestion character on a corner of the stroke-input key.

An aspect of an exemplary embodiment may provide a display apparatus including: an inputter configured to receive a stroke input for a key on a virtual keyboard; a controller configured to display on an input window, a character which corresponds to the stroke input key, suggest characters which follow the character which corresponds to the stroke input key, and display the suggested characters around the key, in response to the stroke input for the key being received.

The display apparatus may further include a display configured to display the virtual keyboard.

The suggested characters may be arranged differently, according to an input mode of a display apparatus.

The suggested characters may be arranged and displayed at diagonal corners of the stroked key in response to the input mode of the display apparatus being a pointing input mode.

The controller may be configured to remove the suggested characters from the virtual keyboard in response to the input mode of the display apparatus being a pointing input mode and a position of a pointer being more than a predetermined distance away from the recommended characters.

According to the various exemplary embodiments as described above, a character input method and a display apparatus are provided, which can improve user convenience and input accuracy in response to a character being suggested on a virtual keyboard.

BRIEF DESCRIPTION OF THE DRAWINGS

The above and/or other aspects will be more apparent by describing in detail exemplary embodiments, with reference to the accompanying drawings, in which.

DETAILED DESCRIPTION OF THE EXEMPLARY EMBODIMENTS

Figure 1:
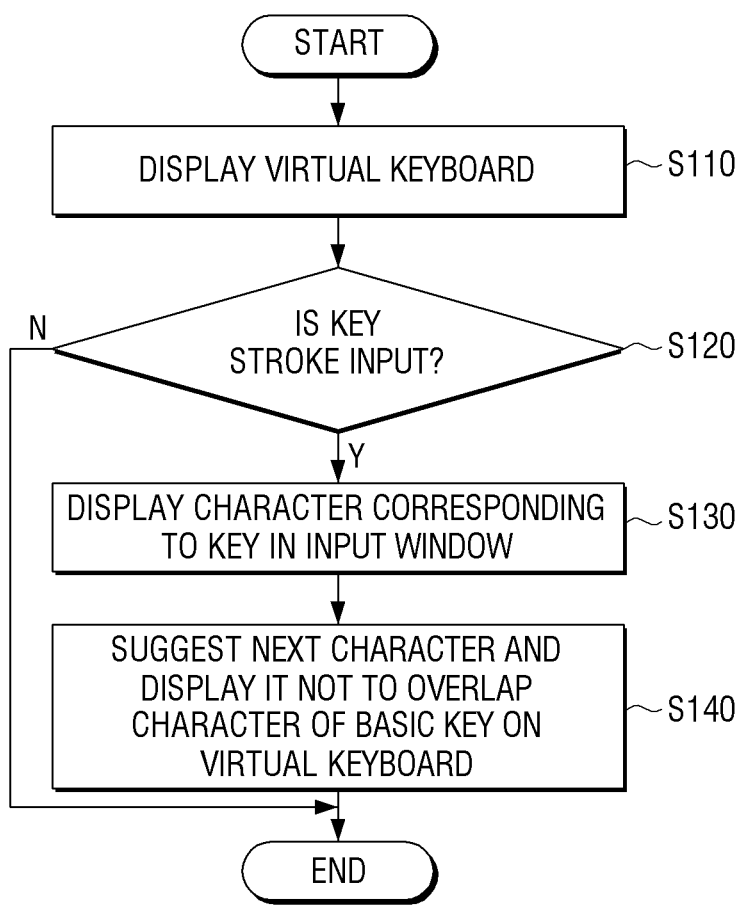
FIG. 1 is a flowchart which illustrates a character input method according to an exemplary embodiment.

Hereinafter, exemplary embodiments will be described in greater detail with reference to the accompanying drawings.

In the following description, the same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

In response to a stroke being input onto a key on a virtual keyboard, a display apparatus according to an exemplary embodiment can suggest another character that may follow a character which corresponds to the key and display the suggested character. That is, in response to a user inputting a character by stroking a certain corresponding key on the virtual board, the display apparatus can suggest a character that may follow the character in a specific term or a language use situation, and display the suggested character. For example, in response to the user inputting 's', the display apparatus can suggest a letter of the alphabet that may be located after 's'. When an English word starting 's' is 'secret', the display apparatus may suggest 'e'. According to an exemplary embodiment, the suggested character may be displayed around the input character.

However, in response to the suggested character being displayed around the input key, the suggested character may cover another key located around the input key and thus may block a whole or a part of the character displayed on the another key.

In response to the another key being blocked as described above, it is difficult for the user to input a stroke onto the blocked key since the blocked key is not well seen, which may cause inconvenience to the user. In addition, although the user intends to input the stroke onto the blocked key but may actually input the stroke onto the suggested character, or the user intends to input the stroke onto the suggested character but may actually input the stroke onto the blocked key. That is, the user is likely to input incorrectly. Therefore, there is a demand for a method to solve the problem of a basic key being blocked by a suggested character and easily stroking the blocked key when the suggestion character function is being performed.

Figure 2:
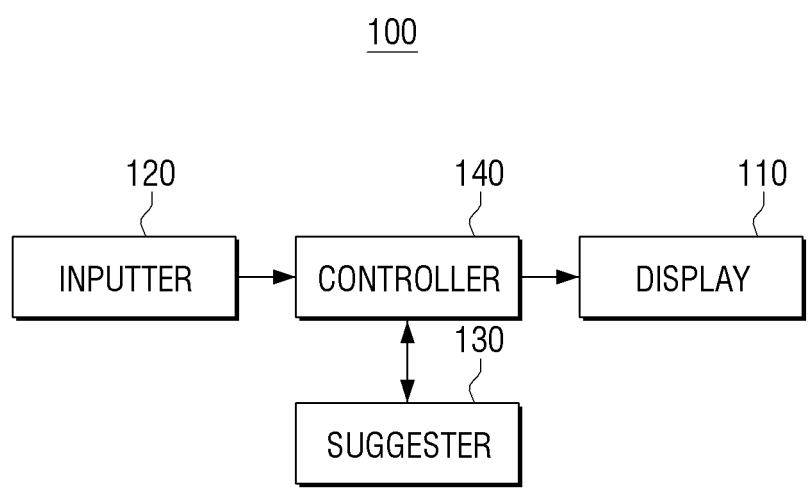
FIG. 2 is a block diagram which illustrates a configuration of a display apparatus according to another exemplary embodiment.

FIG. 1 is a flowchart which illustrates a character input method according to an exemplary embodiment, and FIG. 2 is a block diagram which illustrates a configuration of a display apparatus 100 according to another exemplary embodiment.

The display apparatus 100 according to an exemplary embodiment may be any one of various kinds of computing apparatuses equipped with a displaying means. For example, the display apparatus 100 may be implemented by using various kinds of display apparatuses such as a smart TV, a tablet PC, a smartphone, a cellular phone, a PC, a laptop PC, a TV, an electronic album, a kiosk, etc.

Referring to FIG. 2, the display apparatus 100 according to an exemplary embodiment includes a display 110, an inputter 120, a suggester 130 and a controller 140.

Figure 3A:
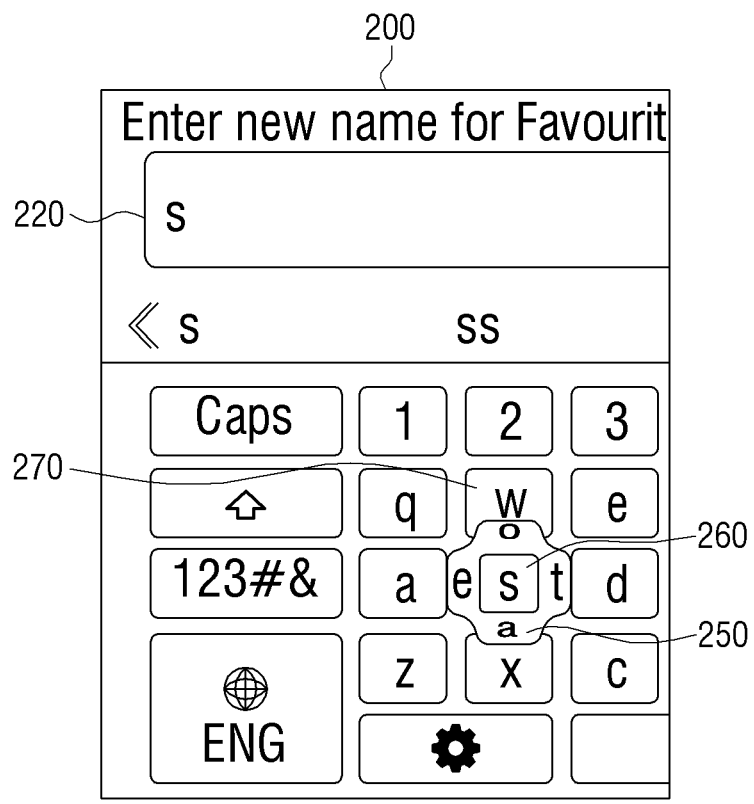
FIGS. 3A to 3E are views which illustrate arrangements of suggestion characters according to an exemplary embodiment.
Figure 3A:
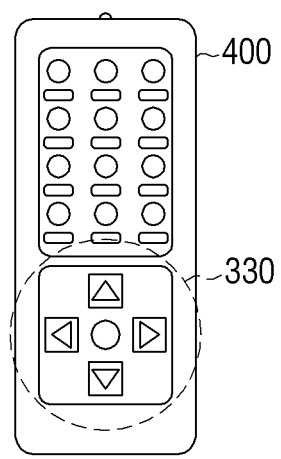
Figure 3B:
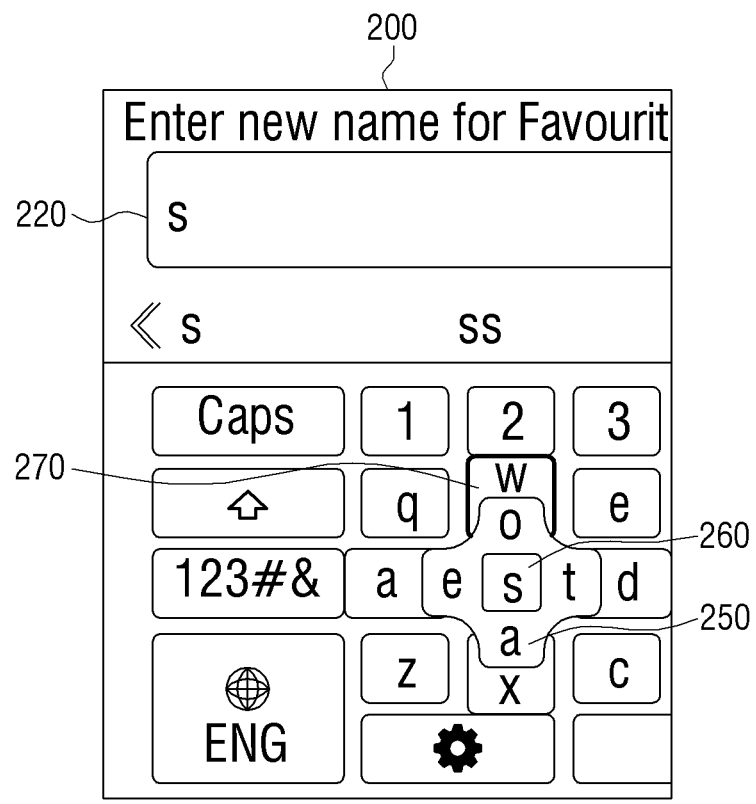
Figure 3B:
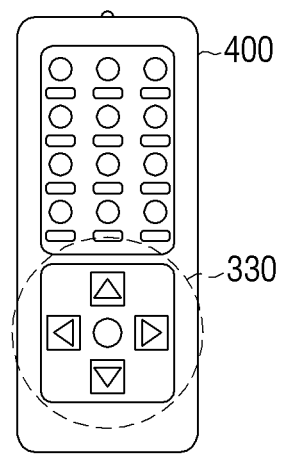
Figure 3C:
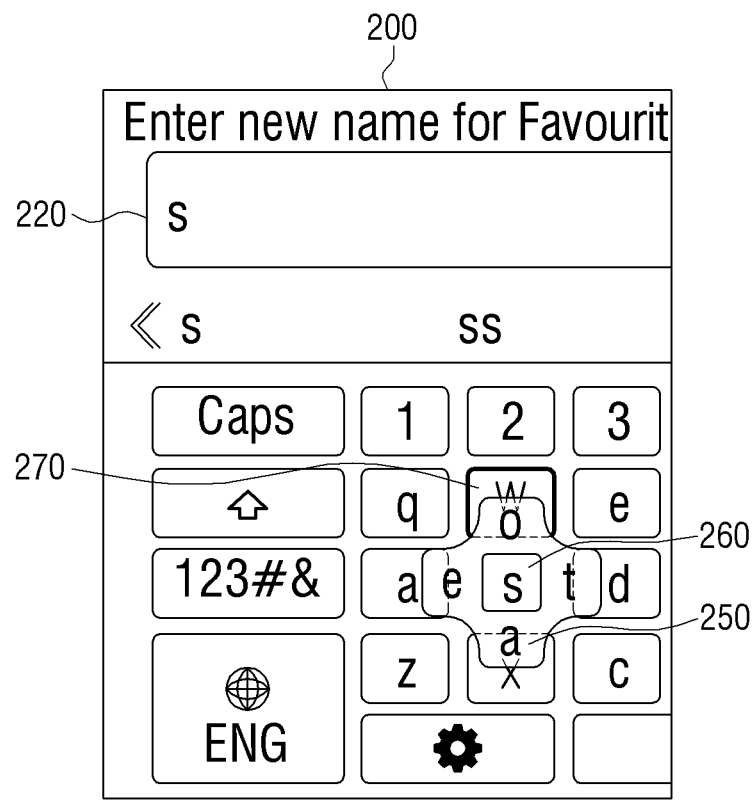
Figure 3C:
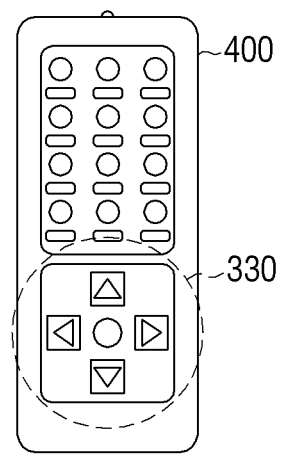

The display 110 is configured to display an image including an object. In particular, the display 110 displays a virtual keyboard in response to necessity to input a character as shown in FIGS. 3A to 3C (S210).

The necessity to input the character may arise when the user should input at least one character through the display apparatus, such as in response to the user retrieving information from the Internet, writes an email, creates a document, logs in an account, or sends a text message, but is no limited thereto.

The virtual keyboard includes a plurality of keys onto which the user can input a stroke. In response to the stroke being input onto each key, at least one of corresponding English letter, Chinese letter, Korean consonant or vowel, Japanese letter, number, function key, special character, space, enter, other kinds of characters, etc. is displayed in an input window.

The display 110 may be implemented by using various display technologies such as an Organic Light Emitting Diode (OLED), a Liquid Crystal Display (LCD) panel, a Plasma Display Panel (PDP), a Vacuum Fluorescent Display (VFD), a Field Emission Display (FED), an Electro Luminescence Display (ELD), etc. In addition, the display 110 may be implemented by using a flexible display or a transparent display. In addition, the display 110 may include a driving circuit to drive such a display panel.

The inputter 120 is configured to receive a variety of user inputs. In particular, the inputter 120 receives a stroke input onto a key on the virtual keyboard (S120). To achieve this, the inputter 120 may include a wired interface module or a wireless interface module.

Such a communication module may be implemented by using a wired interface module conforming to at least one of the standards, Digital Visual Interface (DVI), High-Definition Multimedia Interface (HDMI), Digital Interactive Interface for Video and Audio (DIIVA), Mobile High Definition Link (MHL), Universal Serial Bus (USB), etc.

Alternatively, the communication module may be implemented by using a short-range wireless communication module such as a Bluetooth® module, an Infrared Data Association (IrDA) module, a Near Field Communication (NFC) module, and a Zigbee® module.

The inputter 120 receives a control signal for the stroke input onto the key of the virtual keyboard through the communication module. The inputter 120 may be implemented to directly receive a user input through a display screen such as a touch screen (not shown).

Alternatively, a remote control apparatus (not shown) may be used to transmit the control signal.

The remote control apparatus supporting a pointing mode is used to move a pointer displayed on the screen of the display apparatus 100 to a location as desired by the user. In addition, the remote control apparatus may be used to input a stroke onto a key where the pointer is placed. For example, the remote control apparatus may be a mouse, a remote controller with a direction key, a remote controller with a motion sensor, a touch pad remote controller, etc.

The remote control apparatus supporting a direction input mode does not move the pointer on the screen and moves an activation location of each key. The key being activated waits for the stroke input and is displayed to be distinguished from other keys. For example, a highlight may be displayed on the key being activated. In response to a stroke input signal generated by the remote control apparatus being transmitted to the display apparatus 100, the key being activated is selected and a corresponding character is displayed in the input window. Once a key of a certain direction is pressed in the direction input mode, the key being currently activated is inactivated and another key closest to the inactivated key in the direction is activated and displayed in order to be distinguished from other keys.

The remote control apparatus may support the pointing input mode or the direction input mode or may support both of them. In addition, the remote control apparatus may support a motion input mode.

The remote control apparatus includes a controller (not shown) to generate a control signal for the display apparatus 100 and control the remote control apparatus, and a communicator (not shown) to transmit the control signal to the display apparatus 100.

In addition, the remote control apparatus may include a motion sensor (not shown) to support the motion input mode. The motion sensor senses a motion of the remote control apparatus, processes information related to the motion, converts the information, and transmits the information to the display apparatus 100.

According to an exemplary embodiment, the motion sensor of the remote control apparatus includes a tri-axial geomagnetic sensor and a bi-axial or tri-axial acceleration sensor.

The geomagnetic sensor includes the tri-axial geomagnetic sensor (not shown) to mainly sense directionality. The tri-axial geomagnetic sensor calculates an output value which corresponds to surrounding magnetism by using X, Y, and Z-axis fluxgates intersecting one another. The output value of the tri-axial geomagnetic sensor is a normalized value that is obtained by mapping the output value of each of the X, Y, and Z-axis fluxgates onto a predetermined range (for example, −1 or 1). In this case, an offset value and a scale value which are used in the normalizing process are pre-set and stored in an internal memory (not shown).

The tri-axial geomagnetic sensor includes a driving signal generator to generate a driving signal for driving the X, Y, and Z-axis fluxgates and output the driving signal. The driving signal may be provided in the form of a pulse or a reverse pulse. The X, Y, and Z-axis fluxgates include 3 cores intersecting one another and coils wound around the cores. Accordingly, in response to the driving signal being applied to each coil, the coil is excited and outputs an output value corresponding to surrounding magnetism. In addition, the tri-axial geomagnetic sensor performs various processing operations such as amplification and A/D conversion with respect to the output values from the X, Y and Z-axis fluxgates. The controller of the remote control apparatus normalizes the output value of a signal processor by using the pre-set offset value and scale values and outputs the normalized value to the outside. The normalizing may be performed by using following Equation 1:

$$Xf_{norm} = \frac{(Xf - Xf_{bias})}{Xf_{sf}} * \alpha \qquad \text{Equation 1}$$

$$Yf_{norm} = \frac{(Yf - Yf_{bias})}{Yf_{sf}} * \alpha$$

$$Zf_{norm} = \frac{(Zf - Zf_{bias})}{Zf_{sf}} * \alpha$$

$$Xf_{offset} = \frac{Xf_{max} + Xf_{min}}{2}, Xf_{sf} = \frac{Xf_{max} - Xf_{min}}{2}$$

$$Yf_{offset} = \frac{Yf_{max} + Yf_{min}}{2}, Yf_{sf} = \frac{Yf_{max} - Yf_{min}}{2}$$

$$Zf_{offset} = \frac{Zf_{max} + Zf_{min}}{2}, Zf_{sf} = \frac{Zf_{max} - Zf_{min}}{2}$$

where Xf, Yf, and Zf are 3-axis output values of the signal processor, $Xf_{norm}$, $Yf_{norm}$, and $Zf_{norm}$ are 3-axis normalized values, $Xf_{max}$ and $Xf_{min}$ are a maximum value and a minimum value of Xf, $Yf_{max}$ and $Yf_{min}$ are a maximum value and a minimum value of Yf, $Zf_{max}$ and $Zf_{min}$ are a maximum value and a minimum value of Zf, and α is a fixed constant. α is less than 1 so that a signal-processed output value can be mapped onto a value within a range of ±1 in a horizontal state. For example, a may be set by using a representative dip value of a region where the remote control apparatus is used. The dip in Korea is about 53° and thus α may be set by using cos 53°≈0.6. $Xf_{max}$, $Xf_{min}$, $Yf_{max}$, $Yf_{min}$, $Zf_{max}$ and $Zf_{min}$ are determined by rotating an azimuth measuring apparatus one or more times and measuring output values, and selecting a maximum value and a minimum value out of the output values. The set α, $Xf_{max}$, $Xf_{min}$, $Yf_{max}$, $Yf_{min}$, $Zf_{max}$ and $Zf_{min}$ may be stored in a memory (not shown) provided in the tri-axial geomagnetic sensor or stored in an external storage (not shown), so that they can be used in the normalizing process.

The acceleration sensor may be implemented by using a bi-axial or tri-axial acceleration sensor. The bi-axial acceleration sensor includes X and Y-axis acceleration sensors (not shown) intersecting each other. The tri-axial acceleration sensor includes X, Y and Z-axis acceleration sensors arranged in different directions and intersecting one another.

The acceleration sensor converts an output value of each of the X, Y and Z-axis acceleration sensors into a digital value, and provides the digital value to a pre-processor (not shown). The pre-processor (not shown) may include a chopping circuit, an amplification circuit, a filter and an A/D converter. Accordingly, the pre-processor chops, amplifies, and filters an electric signal output from the tri-axial acceleration sensor and then converts the signal into a digital voltage value.

The controller (not shown) of the remote control apparatus normalizes the pre-processed output signal of each axis to map it onto a predetermined range, and then calculates a pitch angle and a roll angle by using the normalized value.

For example, in response to the motion sensor including the bi-axial acceleration sensor, the controller of the remote control apparatus may perform normalization by using following Equation 2:

$$Xt_{norm} = \frac{(Xt - Xt_{offset})}{Xt_{Scale}} \qquad \text{Equation 2}$$

$$Yt_{norm} = \frac{(Yt - Yt_{offset})}{Yt_{Scale}}$$

$$Xt_{offset} = \frac{Xt_{max} + Xt_{min}}{2}, Xt_{Scale} = \frac{Xt_{max} - Xt_{min}}{2}$$

$$Yt_{offset} = \frac{Yt_{max} + Yt_{min}}{2}, Yt_{Scale} = \frac{Yt_{max} - Yt_{min}}{2}$$

where Xt and Yt are output values of the X and Y-axis acceleration sensors, $Xt_{norm}$ and $Yt_{norm}$ are normalized values of the X and Y-axis acceleration sensors, $Xt_{max}$ and $Xt_{min}$ are a maximum value and a minimum value of Xt, $Yt_{max}$ and $Yt_{min}$ are a maximum value and a minimum value of Yt, $Xt_{offset}$ and $Yt_{offset}$ are offset values of the X and Y-axis acceleration sensors, and $Xt_{Scale}$ and $Yt_{Scale}$ are scale values of the X and Y-axis acceleration sensors. $Xt_{offset}$, $Yt_{offset}$, $Xt_{Scale}$, and $Yt_{Scale}$ may be calculated by rotating the remote control apparatus equipped with the acceleration sensor several times and may be stored in a storage (not shown) provided in the acceleration sensor.

The controller of the remote control apparatus may calculate the pitch angle and the roll angle by assigning the value of each axis acceleration sensor normalized by using above Equation 2 to following Equation 3:

$$\theta = \sin^{-1}(Xt_{norm}) \qquad \text{Equation 3}$$

$$\phi = \sin^{-1}\left(\frac{Yt_{norm}}{\cos\theta}\right)$$

where θ is a pitch angle and φ is a roll angle.

The controller of the remote control apparatus compares information related to the pitch angle and the roll angle with information stored in the storage in order to determine how much the remote control apparatus is inclined.

In response to the acceleration sensor being implemented by using the tri-axial acceleration sensor, the controller of the remote control apparatus may normalize the output value of each of the X, Y and Z-axis acceleration sensors, which is received through the pre-processor, to map it onto a predetermined range, and may calculate the pitch angle and the roll angle by using the normalized value.

The controller of the remote control apparatus compares information on the pitch angle and the roll angle with information stored in the storage to determine how much the remote control apparatus is inclined. In response to the remote control apparatus including the above-described motion sensor, the display apparatus 100 may receive a control signal which is generated based on motion information of the remote control apparatus. The motion information of the remote control apparatus corresponds to a gesture input and the user may input a gesture by using the remote control apparatus.

According to an exemplary embodiment, it is possible to input a gesture without the remote control apparatus. For example, it is possible to generate a control signal which corresponds to the control signal of the above-described remote control apparatus based on a user's hand gesture. In this case, the display apparatus 100 has a camera disposed on a front surface thereof in order to photograph a user's hand on a real time basis and analyze a motion of the user's hand. In response to the user's hand being moved, the motion of the user's hand is analyzed and the pointer is moved or the key being activated is changed according to the motion of the user's hand. In this case, the inputter 120 includes an image sensor circuit configuration and an image processing module.

The controller 140 controls an overall operation of the display apparatus 100.

In response to a stroke input onto a certain key of the virtual keyboard being received (S120—Y), the controller 140 controls the display 110 to display a character corresponding to the key in the input window (S130).

Specifically, in response to a stroke input signal on a certain key being received through the inputter 120, the controller 140 processes the signal and transmits a corresponding character to the display 110. The display 110 configures a screen to display the character on a location where the input window (not shown) is displayed and applies a voltage to the display panel.

In addition, the controller 140 suggests at least one character that may follow the character which corresponds to the key and controls the display 110 to display the suggested character on the virtual keyboard (S140). In particular, the controller 140 may control to display the at least one character not to overlap a basic character of the virtual keyboard. That is, the at least one character may be displayed on an area where no basic character of the virtual keyboard is displayed.

The area where the character on the virtual keyboard is not displayed refers to an area of the virtual keyboard except for areas where the characters of the keys are displayed. Accordingly, the area where the character on the virtual keyboard is not displayed may include at least one of the area where the character of the key is not displayed, an area between a plurality of keys of the virtual keyboard, a bezel area without the keys of the virtual keyboard and an input window area. A symbol or a picture other than the character on the key may be included.

Specifically, in response to the stroke input signal on the certain key being received through the inputter 120, the controller 140 processes the signal and determines the corresponding character. The controller 140 searches for string information starting with the corresponding character according to predetermined regulations. The string information may be searched for from data stored in the display apparatus 100. Alternatively, the string information may be searched for on the Internet or by another apparatus. In this case, the string information is not directly searched for and a search query is transmitted to an Internet server or another apparatus and a search result is received from the server or another apparatus. In addition, all pieces of string information are not searched and only a character that may follow may be searched for. In response the character that may follow next being determined, the display 110 configures a screen to display the at least one character which is determined according to priority not to overlap the basic character of the virtual keyboard, and applies the screen to the display panel.

Although the controller 140 may directly search for the character that may follow the character which corresponds to the stroke-input key, a separate suggester 130 may perform such a searching operation. In this case, the controller 140 transmits only the information related to the character which corresponds to the stroke-input key to the suggester 130 and receives only a resulting value from the suggester 130.

The character may be suggested based on at least one of a general use frequency, a frequency of use by the user of the display apparatus 100, and provided service information.

The controller 140 includes a hardware configuration such as a Micro Processing Unit (MPU) or a Central Processing Unit (CPU), a cache memory, a data bus and a software configuration of an operating system or an application for performing a specific purpose. A control command on the respective elements for operating the display apparatus 100 is read out from the memory according to a system clock, and an electric signal is generated according to the read out control command and operates each element of the hardware.

In addition, the display apparatus 100 includes an essential configuration that a general electronic calculation apparatus has. That is, the display apparatus includes a hardware configuration such as a CPU having appropriate control and operation functions, a Random Access Memory (RAM) memory, a high-capacity auxiliary memory apparatus like as a hard disk or a Blu-ray Disc™, an input apparatus like a touch screen, a data bus, etc., and includes an application, a framework and an operating system for performing the above-described functions of the controller 140.

The above-described various exemplary embodiments can solve the problem that the basic key is blocked by the suggested character and suggests the method for easily stroking the blocked key. Hereinafter, a method for arranging a suggestion character according to various exemplary embodiments will be explained.

According to an exemplary embodiment, in response to a stroke being input onto a certain key of the virtual keyboard, the controller 140 suggests a character that may follow a character which corresponds to the stroke-input key. The suggested character may be arranged on a side of the stroke-input key.

In this case, the suggestion character may be displayed in a key type box as shown in FIGS. 3A to 3E so that the suggestion character can be stroked. Strictly speaking, the key type box is distinguished from the key on the virtual keyboard. In response to a stroke input being performed in the box area, the stroke input is regarded as a stroke input onto the suggestion character in the box. In the detailed description, the stroke input onto the suggestion character is explained as the stroke input onto the box area for the convenience of explanation.

However, in response to the suggestion character 250 being arranged on the side of the stroke-input key 260, the basic key 270 originally arranged on the side of the stroke-input key 260 is blocked. Therefore, the user may have difficulty in inputting the basic key 270. The basic key recited herein refers to a key which corresponds to a character arranged on the virtual keyboard before the stroke is input. Accordingly, by displaying the at least one suggestion character on the area where the basic character on the virtual keyboard is not displayed, the basic character is not blocked. Hereinafter, a method for displaying a suggestion character so as not to block a basic key according to various exemplary embodiments will be explained.

According to an exemplary embodiment, by displaying the suggestion character on the side of the stroke-input key in the same was as described above, the neighboring basic key is not blocked. This method is illustrated in FIG. 3A.

FIG. 3A illustrates arrangements of suggestion characters according to an exemplary embodiment.

As shown in FIG. 3A, the suggestion character is displayed on the side of the stroke-input key, but has its shape changed so as not to block the basic key 260 adjacent to the side. As shown in FIG. 3A, there are some spaces between the keys on the virtual keyboard. In addition, there is a space on a border of each key on which the character is not written. In response to the suggestion character being made smaller than the basic key or has its shape changed, the suggestion character may be displayed on the above-described area to be identified with the user's naked eyes. As shown in FIG. 3A, the suggestion characters 'o', 'e', 't', and 'a' have their letter sizes reduced and have their shapes changed so as to have a width larger than a height) (or have the width smaller than the height), and are displayed in the above-described area, so that the suggestion characters can be identified with the user's naked eyes. In addition, a part of the border of the stroke-input basic key 260 is not displayed so as to display the suggestion character 250. Accordingly, another basic key 270 adjacent to the basic key 260 is not blocked and is displayed.

FIG. 3B is a view which illustrates arrangements of suggestion characters according to another exemplary embodiment.

As shown in FIG. 3B, the suggestion character having a similar size to that of the basic key is displayed on the side of the stroke-input key. However, by changing the location of the basic key, the basic key is not blocked. That is, the controller 140 may control to display the at least one suggestion character 250 on the side of the stroke-input key 260 and change the location of the basic key 270 adjacent to the stroke-input key 260.

For example, in response to the stroke being input onto 's' as shown in FIG. 3B, the suggestion character 250 may be displayed on the side of the key of 's' and display locations of the basic keys 'w', 'a', 'x' and 'd' may be changed. In the illustrated example, the basic keys are moved from their original locations by a predetermined distance in the display directions of the suggestion characters, so that the characters of the basic keys cannot be blocked by the suggestion characters and can be identified.

FIG. 3C is a view which illustrates arrangements of suggestion characters according to another exemplary embodiment.

As shown in FIG. 3C, the suggestion character having a similar size to that of the basic key is displayed on the side of the stroke-input key. However, the suggestion character is transparently displayed so as not to block the basic key. That is, by displaying the at least one suggestion character 250 on the side of the stroke-input key 260 transparently, the controller 140 may perform a control operation to control the basic key 270 adjacent to the stroke-input key 260 to be viewed through the suggestion character 250.

For example, in response to the stroke being input onto 's' as shown in FIG. 3C, the suggestion character is transparently displayed on the side of the key of 's' and thus the basic keys 270 'w', 'a', 'x', and 'd' are not blocked.

The suggestion key may not be displayed around the stroke-input key as described above. Instead, the original basic key on the virtual keyboard which corresponds to the suggestion character may be displayed in order to be distinguished from other keys. Such a method is illustrated in FIG. 3D.

Figure 3D:
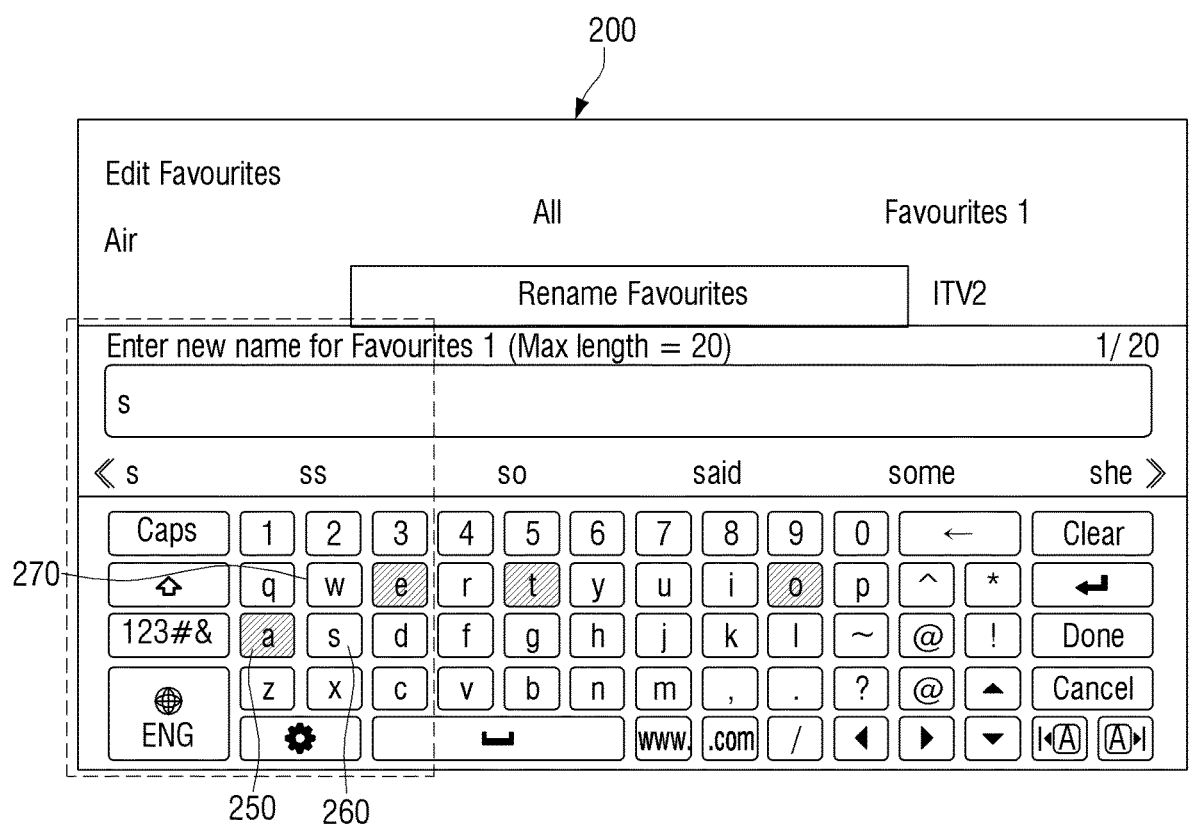

FIG. 3D is a view which illustrates arrangements of suggestion keys according to another exemplary embodiment.

According to an exemplary embodiment, the controller 140 may perform a control operation to control to display the key which corresponds with the at least one suggestion character to be distinguished from other keys on the virtual keyboard 200. By doing so, the suggestion character may be displayed without blocking the basic key.

In response to the stroke being input onto the key 260 of 's' as shown in FIG. 3D, the keys 250 which correspond to the suggestion characters 'a', 'e', 't' and 'o' on the virtual keyboard are highlighted. In addition, in response to priority being given to the suggestion characters, the suggestion characters are distinguished from one another by changing the degree of the highlight.

Figure 3E:
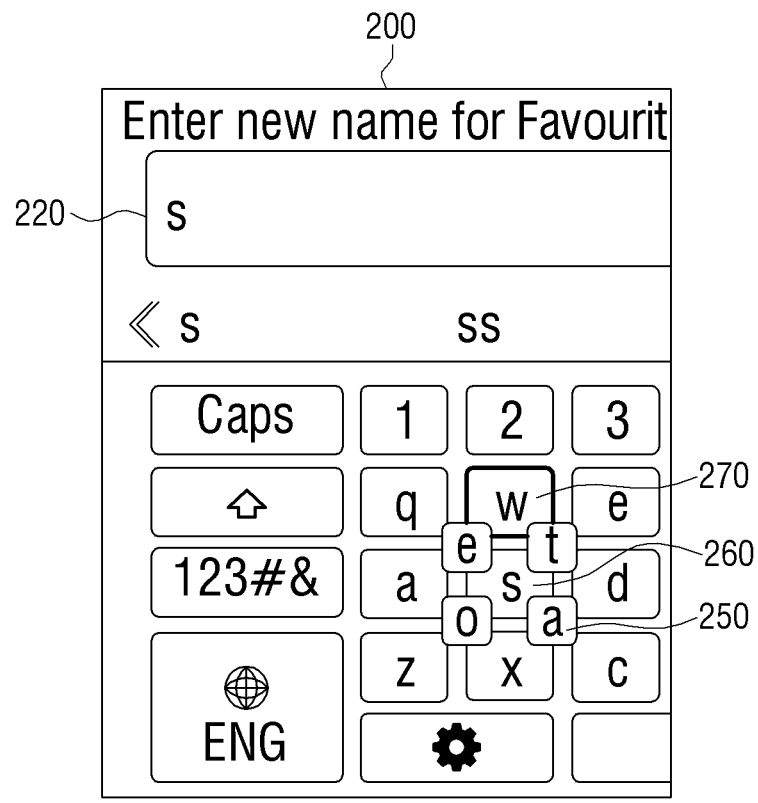
Figure 3E:
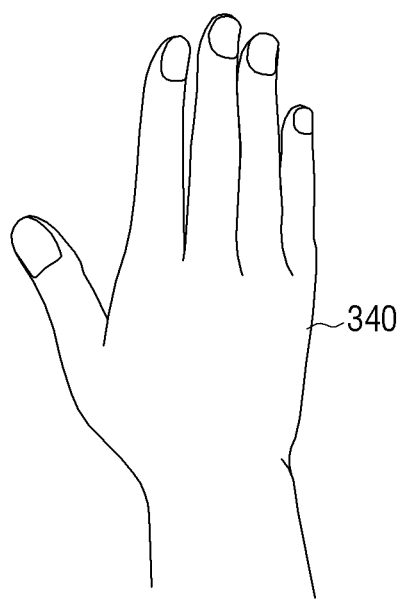

FIG. 3E is a view which illustrates arrangements of suggestion characters according to another exemplary embodiment.

According to another exemplary embodiment, the suggestion character may be displayed on a diagonal direction at a corner of the stroke-input key so as not to overlap the basic key. That is, the suggestion characters 'o', 'a', 'e' and 't' 250 are arranged on the lower left corner, lower right corner, upper left corner, and upper right corner of the stroke-input key 's' 260, respectively, as shown in FIG. 3E.

Since the suggestion characters are arranged on the diagonal direction at corners of the stroke-input key, the suggestion characters hardly block the keys 270 adjacent to the stroke-input key. Accordingly, it is easy to input the stroke onto the neighboring keys 270. In addition, the possibility that the stroke is incorrectly input onto the suggestion character in response to the stroke being input onto the blocked key or the stroke is incorrectly input onto the blocked key in response to the stroke being input onto the suggestion character, is reduced.

Hereinafter, a method of selecting a suggestion character will be explained. The suggestion character may be selected through a remote control apparatus 400 or by inputting a gesture by a user object 340. This method will be explained with reference to FIGS. 3A to 3E.

In response to suggestion characters being displayed on sides of the stroke-input key, the user can easily select a suggestion character through a direction key 330 of the remote control apparatus 400. That is, the remote control apparatus may generate a control command to change an activation location in a specific direction through the direction key 330 and may transmit the control command. A candidate key for inputting a stroke onto the virtual keyboard is activated and is displayed to be distinguished from other keys. For example, in response to a right arrow key 330 of the remote control apparatus 400 being pressed, a control command signal to change the activation location to the right is generated and transmitted to the display apparatus 100. The controller 140 inactivates the activated key and activates the key closest to the inactivated key on the right according to the control command signal. Then, the controller 140 displays the activated key to be distinguished from other keys.

In response to a stroke input command to select the key which is activated through the remote control apparatus 400 being transmitted to the display apparatus, a character which corresponds to the stroke-input key is displayed on the input window 220.

Figure 4:
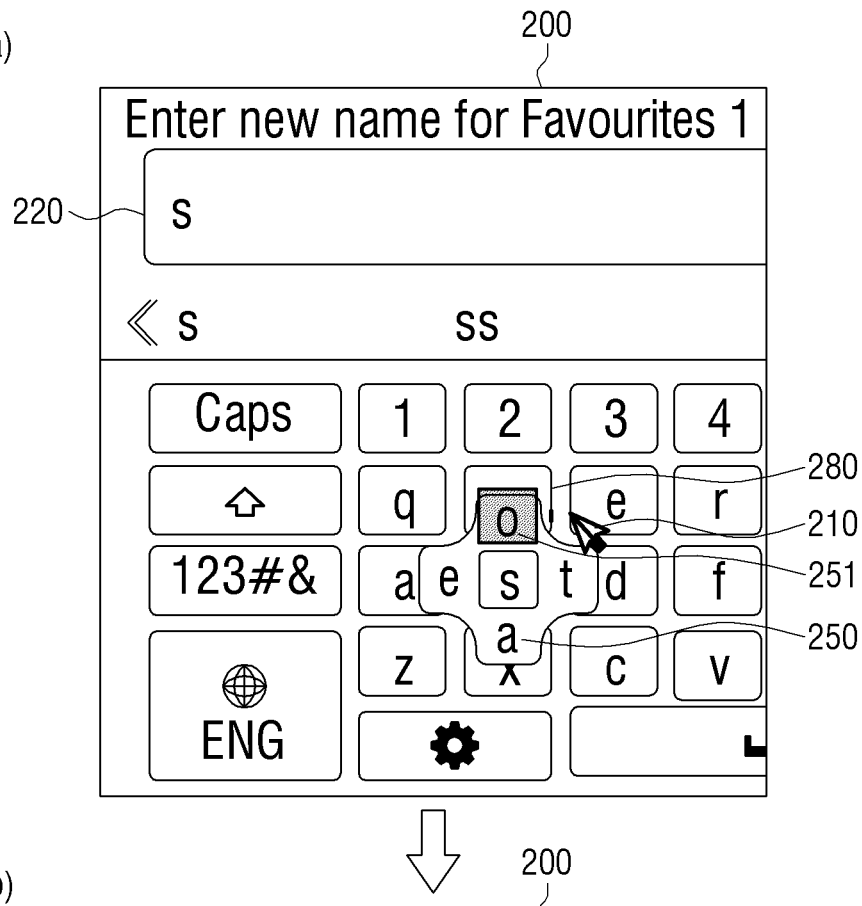
FIG. 4 is a view which illustrates a suggestion character selection screen according to an exemplary embodiment.
Figure 4:
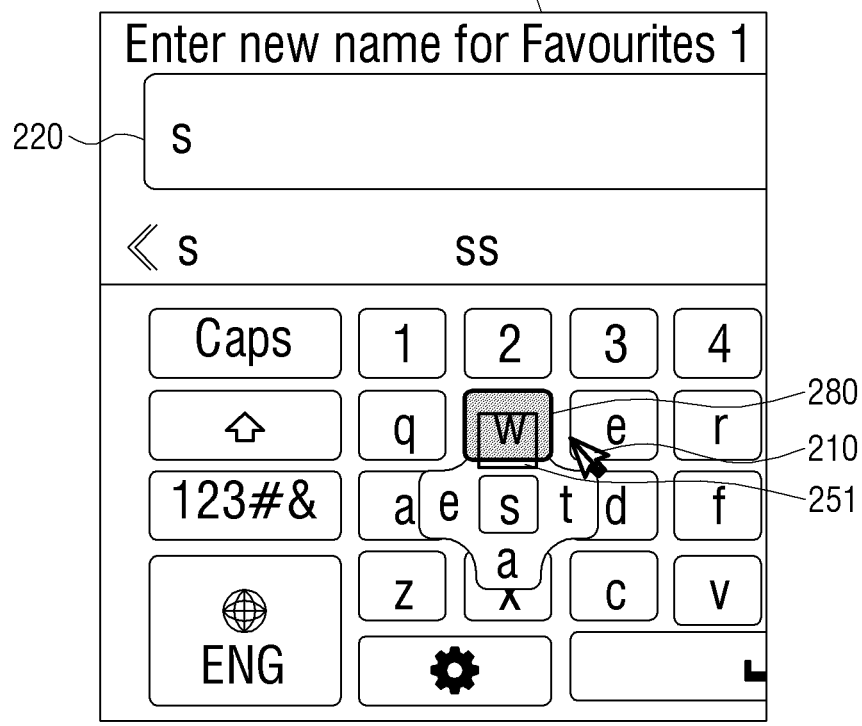

FIG. 4 is a view which illustrates a suggestion character selection screen according to an exemplary embodiment.

In response to a stroke being input onto a certain key as shown in FIG. 4, a character which corresponds to the stroke-input key ('s' in the drawing) is displayed in the input window 220 and the key is activated and displayed to be distinguished from other keys. In addition, one of the suggestion characters displayed around the stroke-input key may be activated and displayed to be distinguished from other keys. In response to a stroke being input onto the activated key or suggestion key which is distinguishable from other keys, the character which corresponds to the key or the stroke-input suggestion character is displayed in the input window 220.

In response to a moving command in one direction being received by the display apparatus 100, the controller 130 controls to display a key closest to the stroke-input key in the one direction to be distinguished from other keys. However, in response to the suggestion characters being the closest key, the suggestion character 251 is displayed to be distinguished from other keys. In this case, in response to the moving command in the same direction being received once more, the suggestion character 251 which has been activated and displayed to be distinguished from other keys is inactivated and is released from the distinguishable display, and a basic key 280 covered by the suggestion character 251 is activated and is displayed to be distinguished from other keys. In this case, the basic key 280 which is displayed to be distinguished from other keys may be displayed ahead of the suggestion character 251 to facilitate the stroke input.

The exemplary embodiment of FIG. 4 is useful when the basic key is blocked. That is, since the basic key can be displayed to be distinguished from other keys through the direction input, the user can see the basic key and the problem that the basic key is blocked can be solved.

View (a) of FIG. 4 illustrates a screen on which, in response to the stroke being input onto the key of 's', characters that may follow 's' are suggested and displayed on the upper, lower, left, and right sides, and one of them, the character 'o' 251, is activated and displayed to be distinguished from other keys. In this case, in response to a moving up command being received, the character 'o' 251 is inactivated and is released from the distinguishable display, and the key 'w' 280 blocked by 'o' on the virtual keyboard is activated and displayed to be distinguished from other keys. Although not shown, in response to the moving up command being received again, the key of 2 is activated and displayed to be distinguished from other key and the key 'w' 280 is inactivated and is released from the distinguishable display. In response to a stroke being input, the character that is activated and displayed to be distinguished from other keys or the character corresponding to the activated key is displayed in the input window 220.

The suggestion character is not selected only by the direction key 330 of the remote control apparatus 400. The suggestion character may be selected by moving a pointer through a pointing apparatus (or a pointing function of the remote control apparatus 400) or by inputting a gesture.

For example, by moving a pointer through the remote control apparatus 400 or the pointing apparatus and placing the pointer on a key, the key may be activated. The activated key is displayed to be distinguished from other keys. However, in the exemplary embodiment of FIG. 3A, the basic key is blocked and thus it may be difficult to identify and select the basic key by using the pointing apparatus or a pointing mode of the remote control apparatus 400. However, in the exemplary embodiments of FIG. 3B to 3E, the basic key can be easily identified and selected in this method.

A motion may be input by using a user object such as user's hand. In this case, in response to the user object being moved, the display apparatus 100 photographs the motion of the user object, calculates a vector quantity, and converts the vector quantity into a motion of the pointer. In response to the shape of the object being changed like the user clenching their fist, the display apparatus 100 determines that a stroke is input, selects a suggestion character, and inputs the suggestion character in the input window 220. The motion input method by using the user object can be applied to the exemplary embodiments of FIGS. 3B to 3E.

FIG. 3E illustrates the case in which a gesture is input by the user's hand 340. In this case, the pointer is moved on the screen according to the motion of the hand 340 and a key where the pointer is placed is activated. Likewise, the activated key is displayed to be distinguished from other keys. In response to the shape of the hand 340 being changed without changing the location of the hand 340, a stroke may be input onto the activated key. For example, in response to the user clenching their fist, the stroke is input onto the key where the pointer is currently placed.

In response to the stroke being input onto the activated key by changing the shape of the hand 340, the character corresponding to the stroke-input key is displayed in the input window 220. In FIG. 3B, the stroke is input onto 's' and accordingly 's' is displayed in the input window 220.

In response to the remote control apparatus 400 including the above-described motion sensor, a motion sensed by the remote control apparatus 400 may be converted into an event and the controller 140 may select a suggestion character according to the converted event.

In response to an event in which the remote control apparatus 400 is inclined occurring in the exemplary embodiment of FIG. 3A, the suggestion character located closest to the stroke-input key in the inclined direction of the remote control apparatus 400 is activated. In response to an inclined angle exceeding a predetermined range, the key that is located next to the activated character is activated and the activated character is inactivated. In response to a stroke being input while a certain key or a suggestion character is activated, the stroke is input into the activated character or key and the suggestion character or the character which responds to the key is input in the input window.

The above-described selection method is applicable to all of the cases of FIGS. 3A to 3E. In FIG. 3E, in response to the remote control apparatus 400 being inclined toward the right down to the ground, 'e', 't' and 'o' are activated in sequence according to the inclination of the remote control apparatus 400. In response to the remote control apparatus 400 being further inclined from 'o', 'a' may be activated (as the degree of inclination increases, the remote control apparatus may be rotated).

According to an exemplary embodiment, the suggestion character or the basic key may be selected in a rotation direction other than the inclination of the remote control apparatus 400. For example, in response to the remote control apparatus 400 being rotated in a clockwise direction in parallel to the ground, the suggestion characters may be activated in sequence in the clockwise direction with reference to a predetermined radius of rotation. In response to the remote control apparatus 400 being rotated in a counter clockwise direction, the same operation may be performed in the counter clockwise direction.

The above-described two selection methods may be combined. That is, in response to the remote control apparatus being rotated, the suggestion character may be activated, and, in response to the remote control apparatus being inclined, the basic key blocked by the activated suggestion character may be activated as shown in FIG. 3A.

Figure 5:
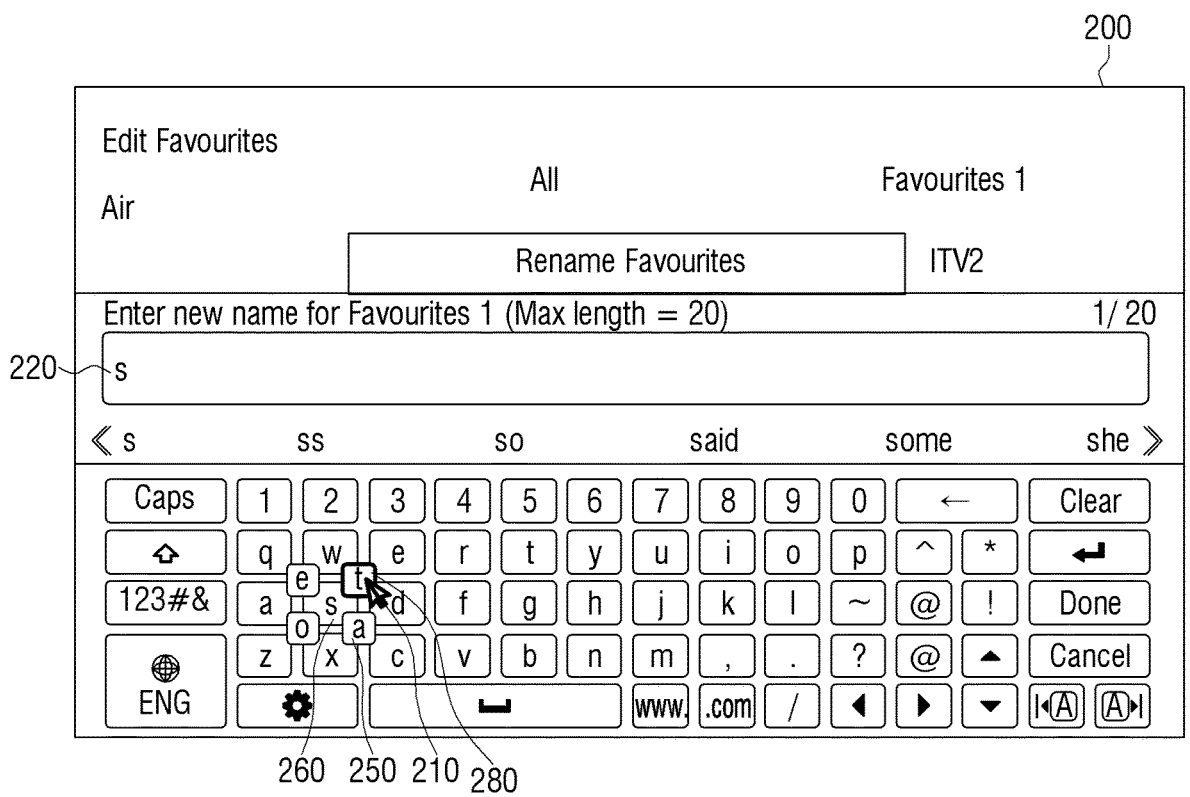
FIG. 5 is a view which illustrates an operation of selecting a suggestion character according to an exemplary embodiment.

FIG. 5 is a view which illustrates a method of selecting a suggestion character according to an exemplary embodiment.

In FIG. 5, a pointer 210 is placed on the character 't' 280. The character 280 is highlighted so as to be distinguished from other keys. In response to the location of the pointer 210 being changed, the highlight of the character 280 disappears and a key or a character where the pointer is newly placed is highlighted. FIG. 5 illustrates an exemplary embodiment in which, in response to a stroke being input onto the key 260 for 's', the character 's' is displayed in the input window 220 and suggestion characters 250 and 280 are displayed on the diagonal direction corners of the key 260.

It is common that the suggestion character blocks the other keys on the virtual key. Therefore, in response to the user having no intention to input the suggestion character anymore, the display of the suggestion character is promptly ended so that the normal use of the display apparatus is facilitated. Hereinafter, a method for facilitating this use of the display apparatus will be explained.

Figure 6A:
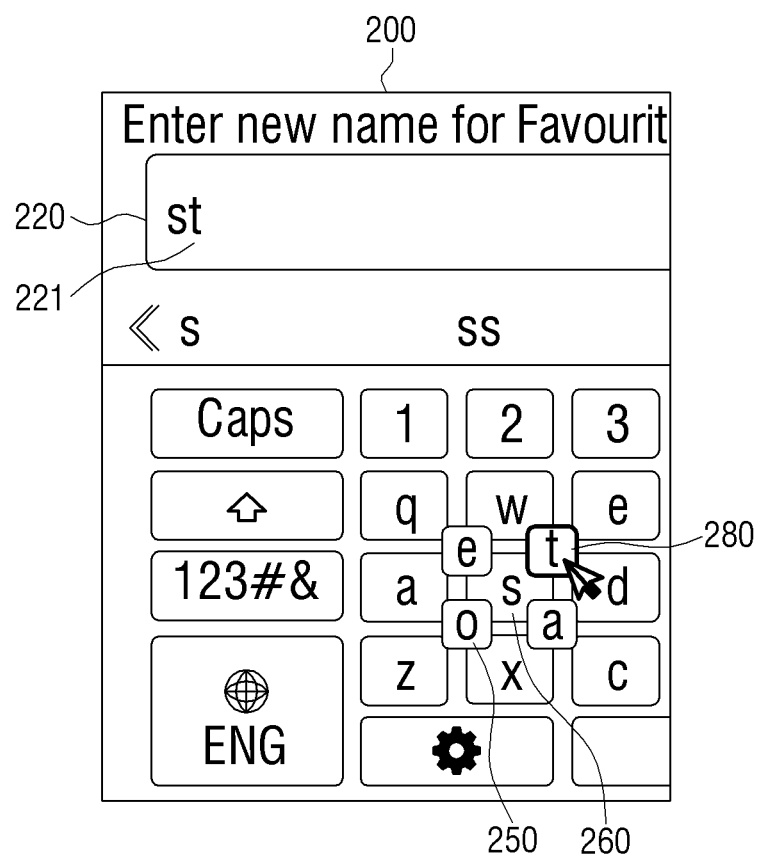
FIGS. 6A and 6B are views which illustrate a screen displayed in response to a stroke being input onto a suggestion character.
Figure 6B:
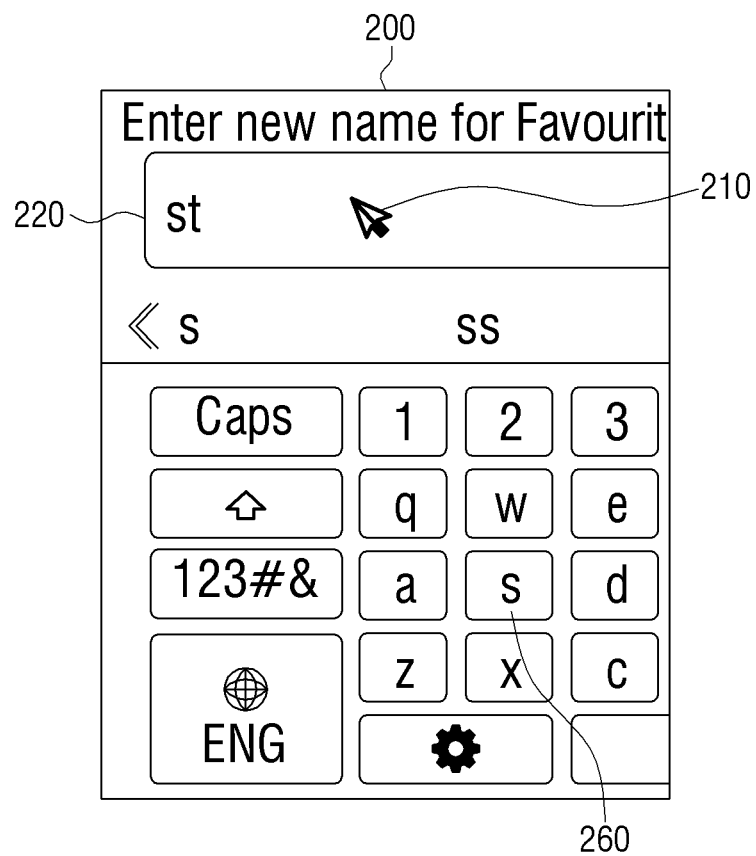

FIGS. 6A and 6B are views which illustrate a screen displayed in response to a stroke being input onto a suggestion character.

In response to the stroke being input onto the suggestion character, the controller 140 performs a control operation to control display of the suggestion character in the input window 220.

Specifically, in response to a stroke input signal for the suggestion character being received through the inputter 120, the controller 140 processes this signal and transmits the suggestion character to the display 110. The display 110 configures a screen to display the suggestion character on a location where the input window is displayed, and applies a voltage to the display panel.

In FIG. 6A, in response to the stroke being input onto the character 't' while the pointer is placed on the character 't' 280, the character 't' is displayed in the input window 220. Since there is a stroke input onto the character 't' after the character 's' corresponding to the initially stroke-input key 260 is displayed in the input window 220, 'st' is finally displayed in the input window 220.

Basically, in response to the stroke being input onto the suggestion character as described above (specifically, in response to the stroke being input onto the box including the suggestion character), the controller 140 performs a control operation to control the suggestion character displayed on the virtual keyboard in order for the suggestion character to disappear from the virtual keyboard.

Specifically, in response to the stroke input signal on the suggestion character being received through the inputter 120, the controller 140 controls the display 110 to display the suggestion character in the input window 220 as described above, and configures a screen to make the displayed suggestion character disappear from the virtual keyboard and applies the screen to the display panel.

In response to the stroke being input onto the character 't' while the pointer is placed on the character 't', the character 't' is displayed in the input window 220 as shown in FIG. 6B. The suggestion characters 'e', 't', 'o' and 'a' disappear from the virtual keyboard.

However, another exemplary embodiment different from this exemplary embodiment may be considered. Although not shown, in response to the stroke being input onto the suggestion character, at least one character that may follow the stroke-input character may be suggested and displayed so as not to overlap the other characters of the virtual keyboard.

In the above-described exemplary embodiment, in response to 't' being selected from the suggestion characters, a character that may follow 't' may be suggested and may be displayed on a corner of the key of 't' on the virtual keyboard.

As described above, in response to the stroke being input onto a certain key on the virtual keyboard, the suggestion characters are continuously displayed around the key until one of the suggestion characters is selected. However, in response to the pointer being moved far away from the suggestion character, it may be determined that the user has no intention to input the suggestion character. In this case, it may not be necessary to display the suggestion character. Hereinafter, a virtual keyboard display in this case will be explained.

Figure 7:
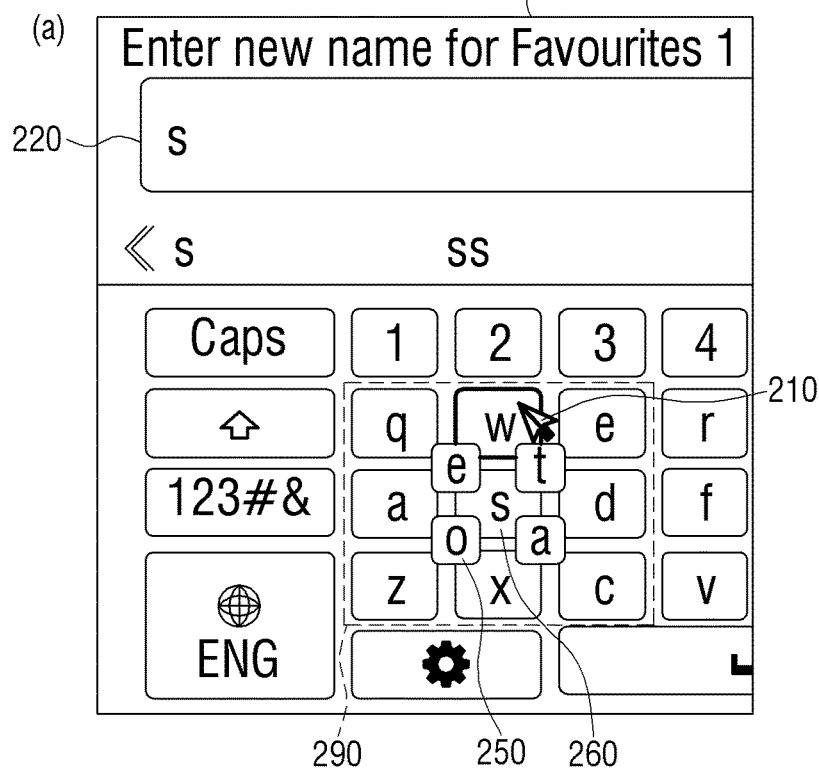
FIG. 7 is a view which illustrates a screen from which a suggestion character disappears according to an exemplary embodiment.
Figure 7:
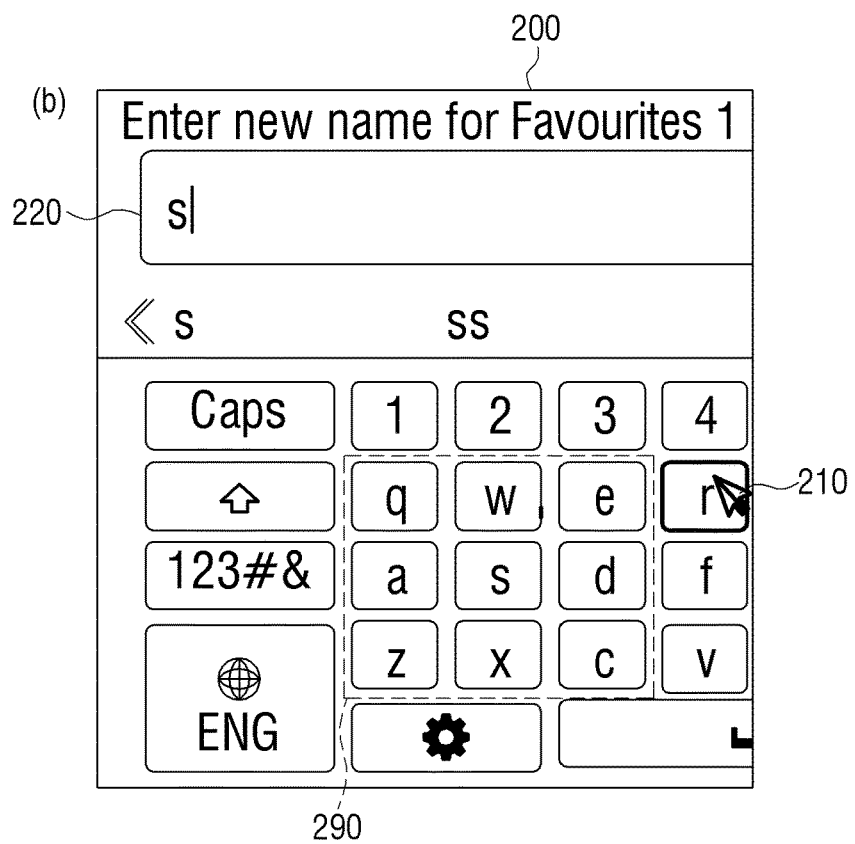

FIG. 7 is a view which illustrates a method of making a suggestion character disappear according to an exemplary embodiment.

According to an exemplary embodiment, in response to a stroke being input onto a certain key on the virtual keyboard, a suggestion character is displayed around the stroke-input key. However, in response to the pointer being located away from the suggestion character by more than a predetermined distance, the controller 140 controls the suggestion character displayed on the virtual keyboard in order to make the suggestion character disappear from the virtual keyboard. That is, in response to the pointer being far away from the suggestion character, a determination is made that the user has no intention to input the suggestion character.

View (a) of FIG. 7 illustrates the state in which the stroke is input onto the key of 's' 260 of the virtual keyboard and then the suggestion characters 250 are displayed around the key of 's'. In response to the pointer being moved within a dashed-line area 290, the suggestion characters are continuously displayed on the virtual keyboard. However, in response to the pointer deviating from the dashed-line area 290, the suggestion characters disappear from the virtual keyboard as shown in view (b) of FIG. 7. Of course, the dashed-line area may be set differently from that of FIG. 7. For example, the dashed-line area may be set as a letter key area of the virtual keyboard. In this case, in response to the pointer being moved to a number key or a special function key, a determination is made that the user has no intention to input the letters.

Figure 8:
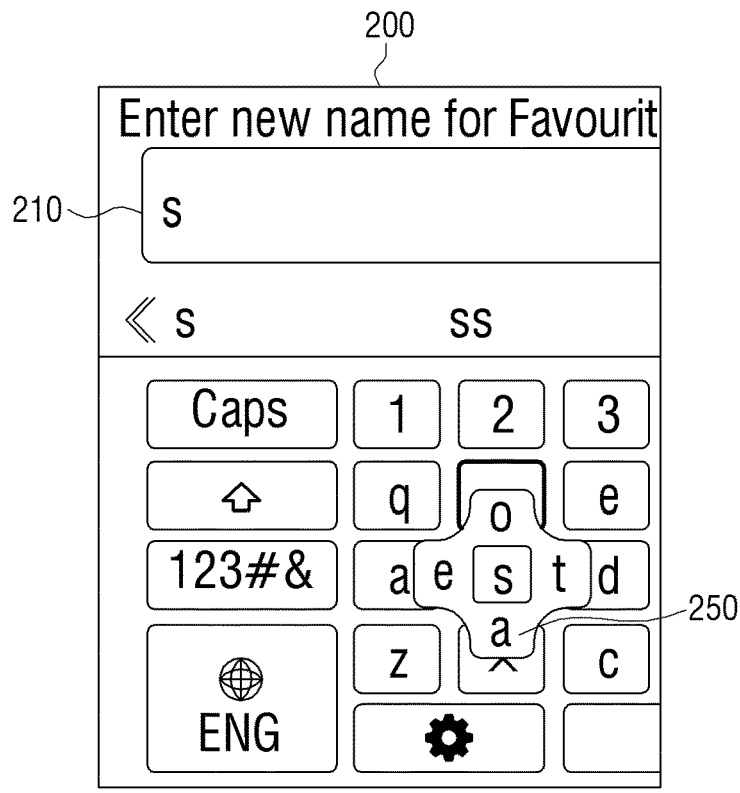
FIG. 8 is a view which illustrates a display screen displayed in response to an input mode of a display apparatus being changed.
Figure 8:
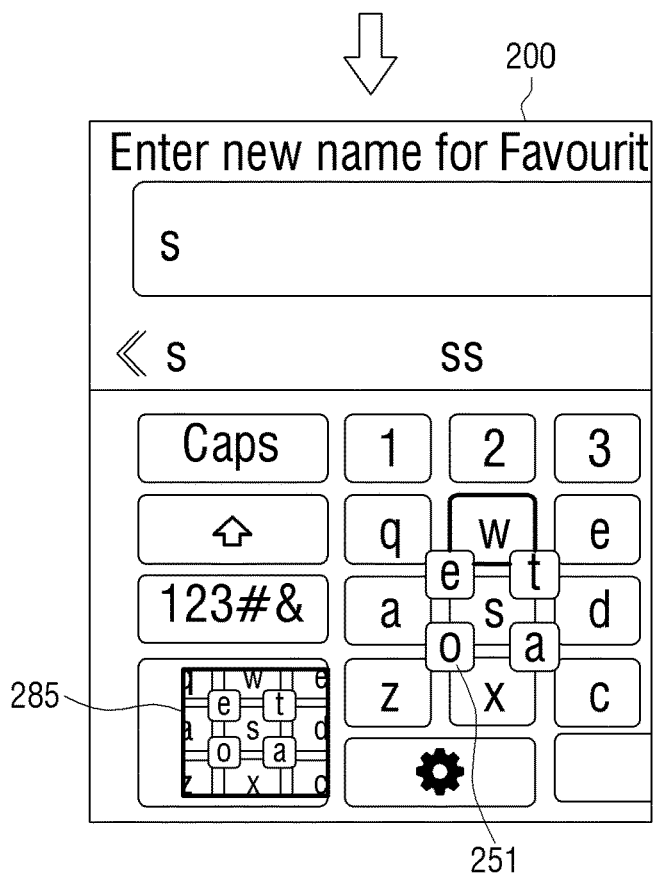

FIG. 8 is a view which illustrates a screen displayed in response to an input mode of the display apparatus being changed.

The display apparatus 100 may change the input mode according to an input mode of the remote control apparatus. That is, the display apparatus 100 may support a pointing input mode or a direction input mode and may support a motion input mode.

In response to the input mode of the display apparatus 100 being changed, a guide on a method for arranging a suggestion character is provided to the user, so that a familiar user experience can be provided. That is, in response to the input mode of the display apparatus 100 being changed, the controller 140 may perform a control operation to display information related to arrangements of the suggestion characters on a certain area of the virtual keyboard 200.

For example, in response to the input mode of the display apparatus 100 being changed from the direction input mode to the pointing input mode as shown in FIG. 8, the display apparatus 100 informs how suggestion characters are arranged on a certain lower area of the virtual keyboard. The user may not recognize the change in the input mode of the display apparatus 100 while using the display apparatus 100. In this case, this function serves as a notice regarding the change in the mode. The user may have inconvenience in inputting in a specific input mode depending on a user control command inputting means. In this case, this notice function is useful. Although not shown, in response to the input mode of the display apparatus 100 being changed from the pointing input mode to the direction input mode, the display apparatus 100 may inform the user how the suggestion characters are arranged on a certain lower area of the virtual keyboard.

According to another exemplary embodiment, in response to a moving command in an outward direction being received while a character is activated and displayed to be distinguished from other keys, the suggestion character may disappear. This method will be explained with reference to FIG. 9.

Figure 9:
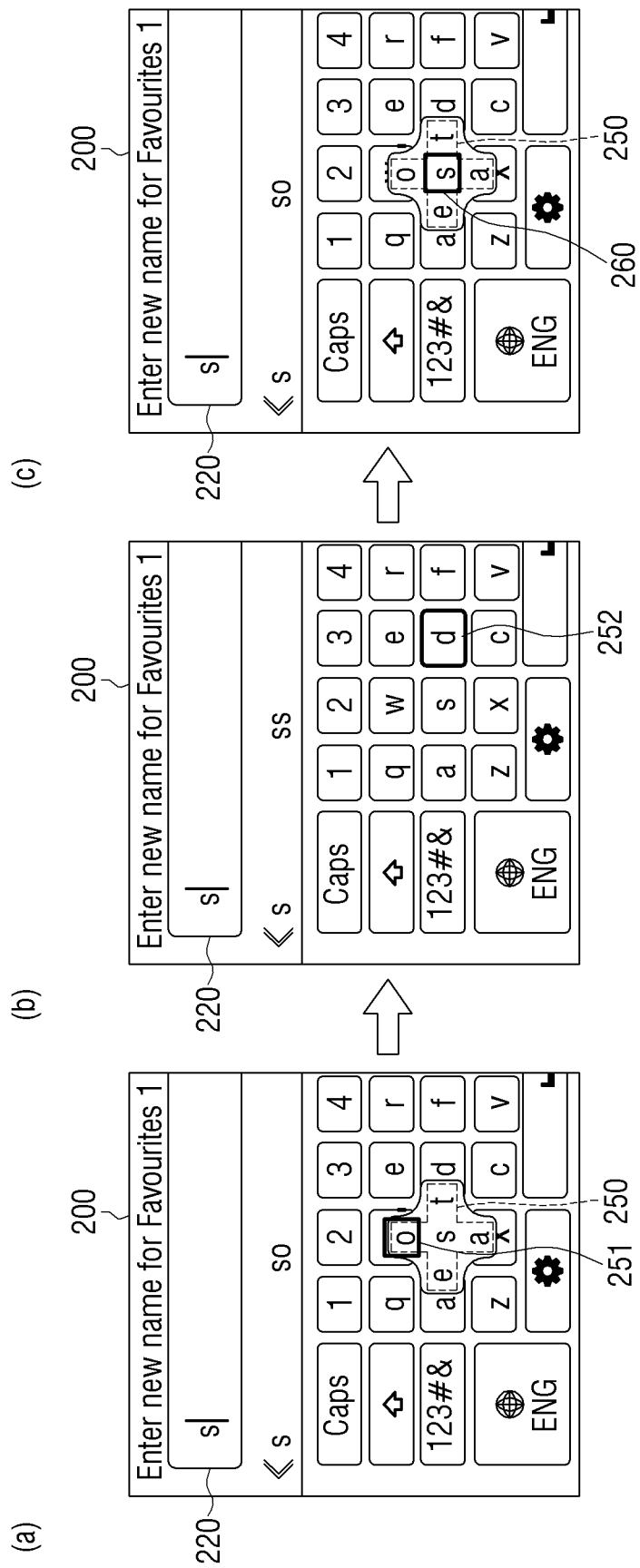
FIGS. 9 and 10 are views which illustrate a screen from which a suggestion character disappears according to another exemplary embodiment.
Figure 10:
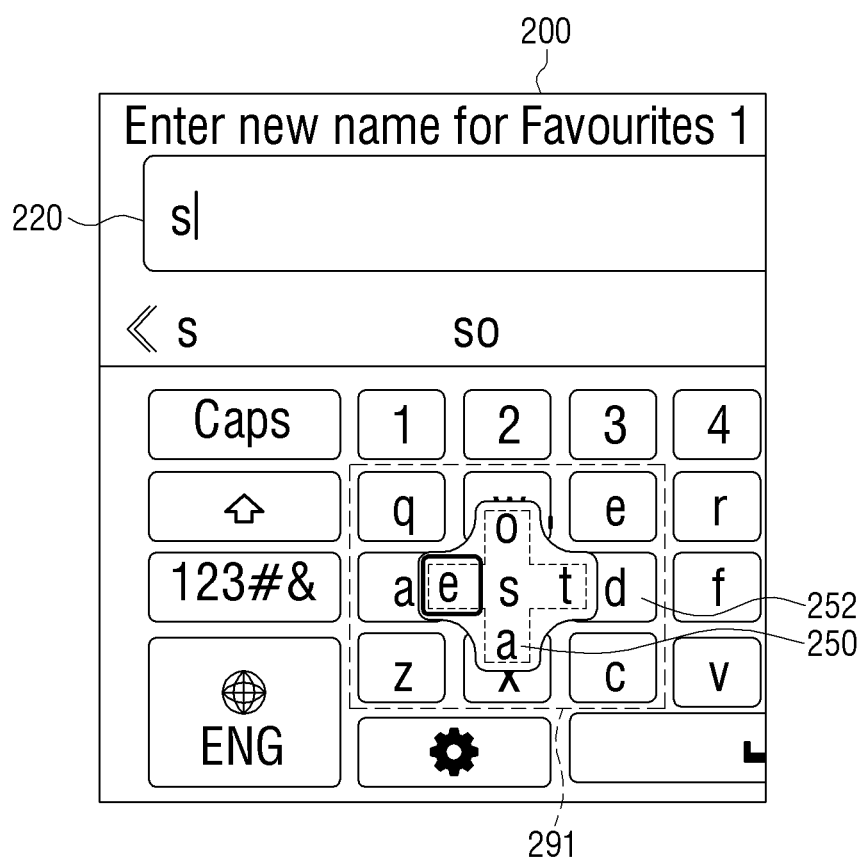

FIGS. 9 and 10 are views which illustrate a method of making a suggestion character disappear from a screen according to another exemplary embodiment.

As shown in view (a) of FIG. 9, in response to a stroke being input onto the key of 's', the suggestion characters 250 are displayed around the key of 's'. The character 'o' may be activated and displayed to be distinguished from other keys.

In response to a moving command being input several times, the key of 'd' 252 may be activated and displayed to be distinguished from other keys as shown in view (b) of FIG. 9. In this case, the suggestion characters disappear. That is, in response to the moving command in the outward direction from the suggestion characters being input, the controller 130 controls the suggestion characters to make them disappear. However, in response to the user wanting to select the suggestion character, a moving command to move to the initially stroke-input key is transmitted.

That is, in response to the key of 's' 260 being activated and displayed to be distinguished from other keys by a moving command in order to move to the left as shown in view (c) of FIG. 9, the suggestion characters 250 appear again.

However, according to another exemplary embodiment, a predetermined area is set and the suggestion character may be set to disappear in response to a command to deviate from the predetermine area being input. This method is illustrated in FIG. 10. The exemplary embodiment of FIG. 10 is similar to the exemplary embodiment of FIG. 7, in which, in response to the pointer being moved far away from the suggestion characters in the pointing mode, a determination is made that the user has no intention to input the suggestion character and the suggestion characters disappear.

In response to a key located away from the suggestion characters by more than a predetermined distance being activated to be stroked, the controller 140 may control the suggestion characters to disappear from the virtual keyboard 200.

In FIG. 10, even in response to keys 'd', 'e', 'c' around the suggestion characters being activated according to a moving command to move from the suggestion characters in the outward direction, the suggestion characters do not disappear. However, in response to the activation location deviating from a dashed-line area 291, the suggestion character disappear from the virtual keyboard. However, the dashed-line area may be set differently from that of FIG. 10. For example, the dashed-line area may be set as a letter key area. In this case, in response to a number key or a special function key being activated, it is determined that the user has no intention to input the letters.

In response to the above-described remote control apparatus including the motion sensor, the remote control apparatus can sense an acceleration and thus may use the acceleration as a user input. That is, in response to the remote control apparatus sensing an acceleration higher than a predetermined value in a display direction of the suggestion character, the remote control apparatus transmits information on the acceleration to the display apparatus 100. The controller 140 determines that the user has no intention to input the suggestion character and thus controls the suggestion character to disappear from the screen. On the other hand, in response to the sensed acceleration being lower than the predetermined value, the suggestion character is continuously displayed.

Hereinafter, a character input method according to various exemplary embodiments will be explained. The character input method according to an exemplary embodiment includes: displaying a virtual keyboard; in response to a stroke input being received, displaying a character which corresponds to the key in an input window, and suggesting at least one character that is likely to follow the character corresponding to the key and displaying the at least one suggested character. The at least one suggested character is displayed so as not to overlap a basic key on the virtual keyboard.

The at least one suggested character may be arranged on a diagonal direction at a corner of the stroke-input key.

The at least one suggested character may be displayed on a side of the stroke-input key with its shape being changed.

The suggesting the at least one character and displaying includes displaying the at least one suggested character on a side of the stroke-input key, changing a location of another key adjacent to the stroke-input key and displaying the another key.

The at least one suggested character may be transparently displayed on a side of the stroke-input key.

The character input method may further include displaying a key which corresponds to the at least one suggested character on the virtual keyboard to be distinguished from other keys.

The character input method may further include displaying a key on the virtual keyboard which corresponds to a location of a pointer to be distinguished from other keys.

The character input method may further include, in response to a stroke being input onto the at least one suggested character, displaying the at least one suggested character in the input window and controlling the at least one suggested keyboard to disappear from the virtual keyboard.

The character input method may further include, in response to a pointer being placed away from the at least one suggested character on the virtual keyboard by more than a predetermined distance, controlling the at least one suggested character to disappear from the virtual keyboard.

The character input method may further include, in response to an input mode of the display apparatus being changed, controlling to display information on a display location of the at least one suggested character on a certain area of the virtual keyboard.

The character input method may further include, in response to an acceleration higher than a predetermined value being sensed in a direction of the at least one suggested character through a remote control apparatus, controlling the at least one suggested character to disappear from the virtual keyboard.

Figure 11:
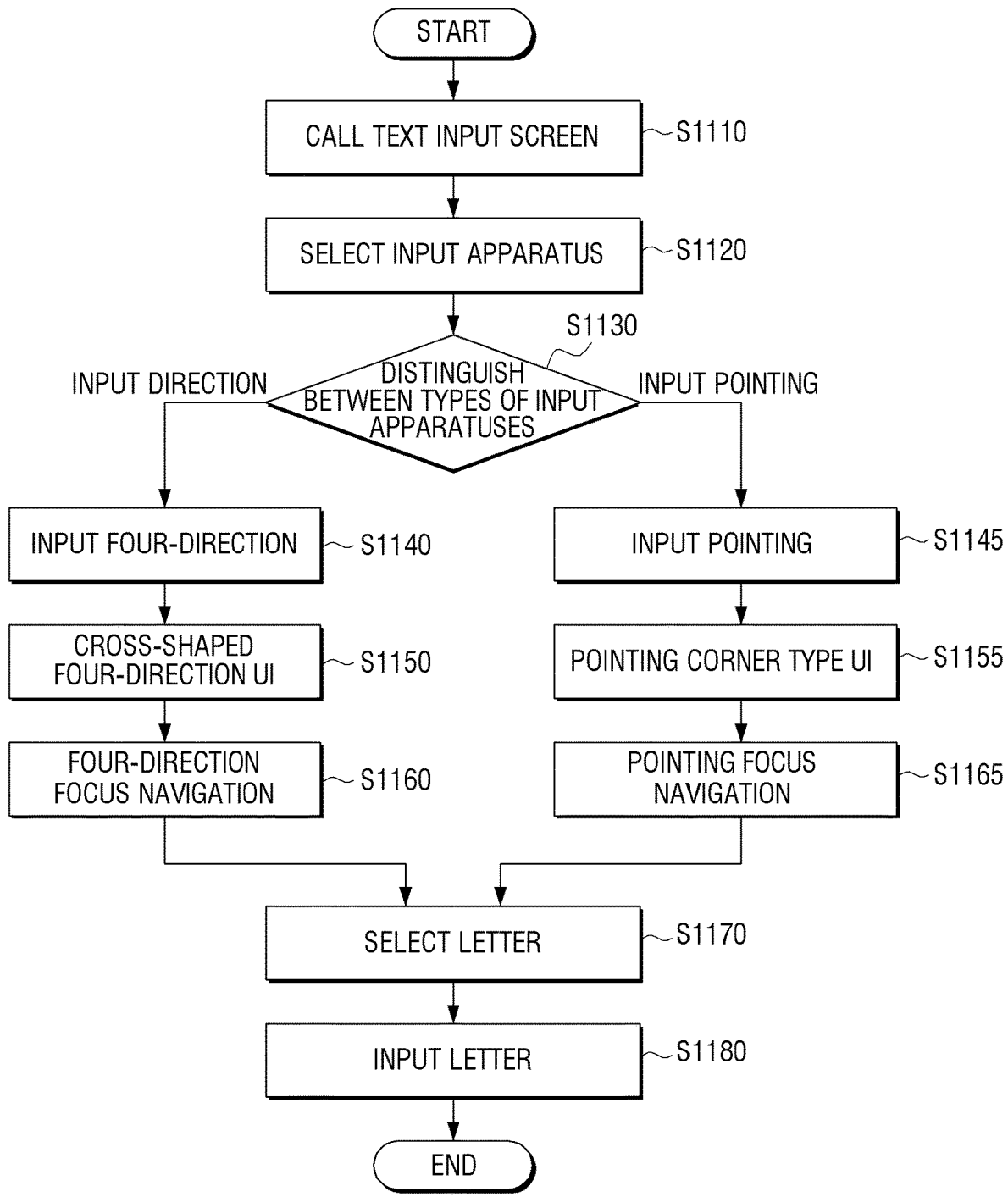
FIG. 11 is a flowchart which illustrates a character input method according to another exemplary embodiment.

Most display apparatuses support one of the pointing mode and the direction input mode according to an input apparatus. Therefore, the character input method may be performed differently according to an input apparatus. FIG. 11 is a flowchart which illustrates a character input method of this case.

That is, FIG. 11 is a flowchart of a character input method according to another exemplary embodiment.

The display apparatus calls a text input screen (S1110). Accordingly, a virtual keyboard and an input window are displayed. Next, an input apparatus is selected (S1120).

The selecting the input apparatus may be determining a kind (or type) of input apparatus. That is, one of a direction input apparatus like a normal remote controller or a pointing input apparatus like a pointer or mouse may be determined.

The kind of the input apparatus may be determined in various ways.

According to an exemplary embodiment, an input apparatus selection input is received and the input apparatus is selected based on the input apparatus selection input. According to another exemplary embodiment, a control signal received from the input apparatus may include information for identifying the kind of the input apparatus.

For example, in response to a direction control signal being received by manipulating a direction key on the direction input apparatus, the display apparatus may determine the input apparatus as the direction input apparatus based on identification information included in the direction control signal. Simply, in response to the direction control signal having a signal value distinguishable from the other control signals, the input apparatus may be determined as the direction input apparatus based on only the direction control signal.

In response to location information on a motion of the input apparatus being received, the display apparatus may determine the input apparatus as the pointing input apparatus according to the location information. Likewise, the location information may be included in the control signal transmitted by the pointing input apparatus and the control signal may include identification information separate from the location information.

The kind of input apparatus may be determined according to a communication method between the display apparatus and the input apparatus. This may apply when there is a difference in the communication interface technology between the display apparatus and the input apparatus.

For example, the display apparatus may receive the control command from the direction input apparatus via IrDA communication, and may receive the control command from the pointing input apparatus via short-range communication. In this case, in response to information being received from the input apparatus via IrDA communication, the display apparatus determines the input apparatus as the direction input apparatus, and, in response to information being received from the input apparatus via Bluetooth® communication or Wi-Fi communication, the display apparatus may determine the input apparatus as the pointing input apparatus. Of course, the method for determining the kind of the input apparatus may be implemented in a different way from the above-described method.

The input method is divided based on the input apparatus selection input (S1130). That is, the type of the input apparatus may be determined based on a signal received from the input apparatus.

For example, in response to a signal being received from the remote control apparatus, a determination is made that the signal is selected from the direction input apparatus based on information included in the received signal (S1130—LEFT). In response to a stroke being input onto a certain key on the virtual keyboard through the direction input apparatus, the display apparatus displays a cross-shaped four-direction UI around the stroke-input key and displays suggestion characters on the upper, lower, left, and right locations (S1150). A key to be selected is activated by a direction input through the input apparatus (S1160). The key being activated waits for the stroke input and may be displayed to be distinguished from other keys. For example, the key being activated may be highlighted. In this case, in response to a stroke input signal generated by the input apparatus being transmitted to the display apparatus, the key being activated is selected (S1170) and a corresponding character is displayed in the input window (S1180). In response to a key in a certain direction being pressed once, the key being currently activated is inactivated and another key closest to the inactivated key in the direction is activated and displayed to be distinguished from other keys.

On the other hand, in response to the signal being received from the remote control apparatus, a determination may be made that the signal is selected from the pointing apparatus based on information included in the signal (S1130—RIGHT). In response to a signal to move the pointer being received from the pointing input apparatus, the pointer is moved according to the signal (S1145). A key on the virtual keyboard where the pointer is placed is activated. The activated key is displayed to be distinguished from other keys. In response to a stroke being input onto a certain key on the virtual keyboard through the input apparatus, the display apparatus displays a corner type UI around the stroke-input key and displays suggestion characters on corners of the key (S1155). In this state, in response to the pointer being moved, a key on the virtual keyboard where the pointer is placed is activated and the other keys are inactivated. The key being activated waits for the stroke input and is displayed to be distinguished from other keys. For example, the key being activated may be highlighted. In this case, in response to a stroke input signal generated by the input apparatus being transmitted to the display apparatus, the key being activated is selected (S1170) and a corresponding character is displayed in the input window (S1180).

The above-described character input method may be stored in a non-transitory computer-readable recording medium in the form of a program. The non-transitory computer-readable recording medium refers to a medium that stores data semi-permanently rather than storing data for a very short time, such as a register, a cache, and a memory, and is readable by an electronic apparatus. Specifically, the non-transitory computer-readable recording medium may be a compact disc (CD), a digital versatile disk (DVD), a Blu-ray Disc™k, a USB, a memory card, a ROM, etc.

In addition, the above-described character input method may be embedded in a hardware IC chip in the form of embedded software and provided, and may be included in the above-described multi content view display apparatus 100 as a part thereof.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
 a display;
 an inputter; and
 a controller configured to:

control the display to display an input window and a virtual keyboard including a plurality of keys, each of the plurality of keys having a corresponding character, based on a stroke input on a key among the plurality of keys being received through the inputter, control the display to display a character of the key in the input window, identify at least one suggestion character related to the character of the key, and control the display to display at least one suggestion key including the at least one suggestion character at a space on the virtual keyboard such that the at least one suggestion character and characters of keys adjacent to the key do not overlap, wherein based on the stroke input on the key being received, a size of the keys adjacent to the key is enlarged and the characters of the keys in the enlarged keys are moved away from the character of the key, and each enlarged key of the enlarged keys overlaps with neither the key that received the stroke input nor a key that is adjacent to the enlarged key and is on an opposite side of the enlarged key with respect to the key that received the stroke input, and wherein the controller is configured to control the display to display the each enlarged key of the enlarged keys to overlap with a corresponding suggestion key of the at least one suggestion key and to display each of the moved characters not to overlap with each of the at least one suggestion character in the at least one suggestion key.

2. The display apparatus of claim 1, wherein, based on a pointer being placed on the key of the virtual keyboard, the controller is configured to display the key on the virtual keyboard to be distinguished from other keys.

3. The display apparatus of claim 1, wherein, based on a stroke input to the at least one suggestion character being received, the controller is configured to display the at least one suggestion character in the input window, and remove the at least one suggestion character from the virtual keyboard after the at least one suggestion character is displayed in the input window.

4. The display apparatus of claim 1, wherein, based on a pointer being moved away from the at least one suggestion character by more than a predetermined distance, the controller is configured to remove the at least one suggestion character from the virtual keyboard.

5. The display apparatus of claim 1, wherein, based on an input mode of the display apparatus being changed, the controller is configured to display information on a display location of the at least one suggestion character on a certain area of the virtual keyboard.

6. The display apparatus of claim 1, wherein, based on an acceleration information of a remote control apparatus being received from the remote control apparatus, the controller is configured to remove the at least one suggestion character from the virtual keyboard, wherein the acceleration information indicates that the remote control apparatus is moved in a direction of the at least one suggestion character at an acceleration higher than a predetermined value.

7. The display apparatus as claimed in claim 1, wherein the at least one suggestion character on the virtual keyboard to be distinguished from other keys is distinguished by being highlighted.

8. A character input method comprising:

displaying an input window and a virtual keyboard including a plurality of keys, each of the plurality of keys having a corresponding character; and based on a stroke input on a key among the plurality of keys being received, displaying a character of the key in the input window;

identifying at least one suggestion character related to the character of the key;

displaying at least one suggestion key including the at least one suggestion character at a space on the virtual keyboard such that the at least one suggestion character and characters of keys adjacent to the key do not overlap, wherein based on the stroke input on the key being received, a size of the keys adjacent to the key is enlarged and the characters of the keys in the enlarged keys are moved away from the character of the key, and each enlarged key of the enlarged keys overlaps with neither the key that received the stroke input nor a key that is adjacent to the enlarged key and is on an opposite side of the enlarged key with respect to the key that received the stroke input, and wherein the each enlarged key of the enlarged keys overlaps with a corresponding suggestion key of the at least one suggestion key, and each of the moved characters does not overlap with each of the at least one suggestion character in the at least one suggestion key.

9. The character input method of claim 8, further comprising, based on an acceleration information of a remote control apparatus being received from the remote control apparatus, removing the at least one suggestion character from the virtual keyboard, and wherein the acceleration information indicates that the remote control apparatus is moved in a direction of the at least one suggestion character at an acceleration higher than a predetermined value.

* * * * *